(12) United States Patent
Goldstein et al.

(10) Patent No.: US 12,717,207 B2
(45) Date of Patent: Aug. 25, 2026

(54) MANAGING OPTICAL PHASED ARRAY PERFORMANCE BASED ON PHASE SHIFT VARIATIONS

(71) Applicant: Analog Photonics LLC, Boston, MA (US)

(72) Inventors: Jordan Goldstein, Boston, MA (US); Christopher Vincent Poulton, Somerville, MA (US); Michael Robert Watts, Hingham, MA (US); Peter Nicholas Russo, Arlington, MA (US); Oleg Shatrovoy, Cambridge, MA (US)

(73) Assignee: Analog Photonics LLC, Boston, MA (US)

( * ) Notice: Subject to any disclaimer, the term of this patent is extended or adjusted under 35 U.S.C. 154(b) by 767 days.

(21) Appl. No.: 18/312,709

(22) Filed: May 5, 2023

(65) Prior Publication Data

US 2023/0367173 A1 Nov. 16, 2023

Related U.S. Application Data

(60) Provisional application No. 63/340,526, filed on May 11, 2022.

(51) Int. Cl.
*G02F 1/29* (2006.01)
*G01S 17/08* (2006.01)
*G06N 7/01* (2023.01)

(52) U.S. Cl.
CPC .............. *G02F 1/292* (2013.01); *G01S 17/08* (2013.01); *G06N 7/01* (2023.01)

(58) Field of Classification Search
None
See application file for complete search history.

(56) References Cited

U.S. PATENT DOCUMENTS 4,151,527 A 4/1979 Masliah et al.
6,711,280 B2 3/2004 Stafsudd et al.
(Continued)

FOREIGN PATENT DOCUMENTS

WO 2020121452 A1 6/2020

OTHER PUBLICATIONS

N. Dostart, M. Brand, B. Zhang, D. Feldkhun, K. Wagner, and M. A. Popovic, “Vernier Si-Photonic Phased Array Transceiver for Grating Lobe Suppression and Extended Field-of-View,” in Conference on Lasers and Electro-Optics, OSA Technical Digest (Optica Publishing Group, 2019), paper AW3K.2.

*Primary Examiner* — Ryan Crockett
(74) *Attorney, Agent, or Firm* — Young Basile Hanlon & MacFarlane. P.C.

(57) ABSTRACT

A method comprises: providing light to a plurality of optical antennas separated by a set of spacings in an optical phased array (OPA), wherein a plurality of phase shifters impose phase shifts onto light provided to respective optical antennas of the plurality of optical antennas; and managing the imposed phase shifts using a phase shift control module. The managing comprises a first mode of operation comprising: for a first subset of optical antennas within a distance from a center of the plurality of optical antennas, determining variations of imposed phase shifts smaller than a phase shift variation range, and for a second subset of optical antennas further than the distance from the center of the plurality of optical antennas, determining variations of imposed phase shifts larger than the phase shift variation range.

22 Claims, 21 Drawing Sheets

(56) References Cited

U.S. PATENT DOCUMENTS

| | | | | |
|---|---|---|---|---|
| 6,842,157 | B2 * | 1/2005 | Phelan | H01Q 21/0087 343/893 |
| 10,790,585 | B2 * | 9/2020 | Poulton | G02F 1/2955 |
| 11,567,177 | B2 * | 1/2023 | Ren | G01S 17/36 |
| 2007/0122155 | A1 | 5/2007 | Hillis et al. | |
| 2017/0107091 | A1 * | 4/2017 | Peirsman | B67D 1/0807 |
| 2018/0107091 | A1 | 4/2018 | Hosseini et al. | |
| 2018/0217472 | A1 * | 8/2018 | Poulton | G02F 1/0147 |
| 2018/0348592 | A1 | 12/2018 | Hosseini et al. | |
| 2019/0056634 | A1 | 2/2019 | Hosseini et al. | |
| 2019/0235233 | A1 | 8/2019 | Russo et al. | |
| 2019/0260123 | A1 | 8/2019 | Poulton et al. | |
| 2020/0225332 | A1 | 7/2020 | Wagner et al. | |
| 2021/0026216 | A1 | 1/2021 | Watts et al. | |
| 2021/0046789 | A1 | 2/2021 | Engl et al. | |
| 2021/0296770 | A1 | 9/2021 | Uyeno et al. | |
| 2022/0102855 | A1 * | 3/2022 | Jia | H01Q 1/243 |
| 2023/0367172 | A1 * | 11/2023 | Goldstein | G06N 7/01 |

* cited by examiner

MANAGING OPTICAL PHASED ARRAY PERFORMANCE BASED ON PHASE SHIFT VARIATIONS

CROSS-REFERENCE TO RELATED APPLICATION(S)

This application claims priority to and the benefit of U.S. Provisional Application Ser. No. 63/340,526, entitled "MITIGATION OF SPURIOUS RETURNS IN OPTICAL PHASED ARRAYS," filed May 11, 2022, the entire disclosure of which is hereby incorporated by reference.

TECHNICAL FIELD

This disclosure relates to managing optical phased array performance based on phase shift variations.

BACKGROUND

Optical phased array (OPA) LiDAR (Light Detection and Ranging) systems may produce return intensity maps containing spurious signal peaks associated with lobes other than an intended lobe of the optical phased array radiation pattern (also called an angular intensity distribution). For example, light associated with a main lobe may be reflected to provide a main signal peak that triggers a detection event, but the radiation pattern typically also includes side lobes on both sides of the main lobe (e.g., based on a finite extent of the OPA) and a number of grating lobes at certain angular spacings (e.g., based on the finite spacings between optical antennas that make up the OPA). The grating lobes may be larger than the side lobes, and light from either the grating lobes and/or side lobes may be reflected to provide spurious (e.g., false or undesired) signal peaks. If the intensity of these spurious signals exceeds the post-digitization noise floor of the LiDAR system, they may register as false detection events which may be problematic for typical LiDAR applications.

SUMMARY

In one aspect, in general, an apparatus comprises: an optical phased array (OPA) comprising: a plurality of optical antennas separated by a set of spacings, and a plurality of phase shifters configured to impose phase shifts onto light provided to respective optical antennas of the plurality of optical antennas; a phase shift control module configured to manage the imposed phase shifts, the managing comprising a first mode of operation comprising: for a first subset of optical antennas within a distance from a center of the plurality of optical antennas, determining variations of imposed phase shifts smaller than a phase shift variation range, and for a second subset of optical antennas further than the distance from the center of the plurality of optical antennas, determining variations of imposed phase shifts larger than the phase shift variation range.

Aspects can include one or more of the following features.

Determining variations of imposed phase shifts for the first subset of optical antennas and determining variations of imposed phase shifts for the second subset of optical antennas comprise determining variations according to a probability distribution.

Determining variations according to a probability distribution comprises determining variations according to a pseudorandom function.

The managing further comprises a second mode of operation comprising: for the first subset of optical antennas and the second subset of optical antennas, determining imposed phase shifts corresponding to a deterministic phase profile.

The deterministic phase profile comprises a linear phase profile that defines a common phase shift to be imposed upon each of the plurality of phase shifters.

The managing further comprises a first scanning mode of operation, wherein a first region is scanned by managing the imposed phase shifts in the first mode of operation for two or more transmitted beam angles.

The managing further comprises a second scanning mode of operation, wherein a second region is scanned by managing the imposed phase shifts in the second mode of operation for two or more transmitted beam angles.

The first region is a subset of the second region.

The apparatus further comprises a control module configured to receive scattered light that was emitted from the OPA and estimate a distance to a target based at least in part on a characteristic of the scattered light.

The OPA is a first OPA and the apparatus further comprises second OPA configured to receive the scattered light that was emitted from the first OPA and provide the scattered light to the control module.

The spacings in the set of spacings are each greater than half of any wavelength in a spectrum of light provided to the plurality of optical antennas in the OPA.

The spacings in the set of spacings are all identical to each other.

In another aspect, in general, a method comprises: providing light to a plurality of optical antennas separated by a set of spacings in an optical phased array (OPA), wherein a plurality of phase shifters impose phase shifts onto light provided to respective optical antennas of the plurality of optical antennas; and managing the imposed phase shifts using a phase shift control module, the managing comprising a first mode of operation comprising: for a first subset of optical antennas within a distance from a center of the plurality of optical antennas, determining variations of imposed phase shifts smaller than a phase shift variation range, and for a second subset of optical antennas further than the distance from the center of the plurality of optical antennas, determining variations of imposed phase shifts larger than the phase shift variation range.

Determining variations of imposed phase shifts for the first subset of optical antennas and determining variations of imposed phase shifts for the second subset of optical antennas comprise determining variations according to a probability distribution.

Determining variations according to a probability distribution comprises determining variations according to a pseudorandom function.

The managing further comprises a second mode of operation comprising: for the first subset of optical antennas and the second subset of optical antennas, determining imposed phase shifts corresponding to a deterministic phase profile.

The deterministic phase profile comprises a linear phase profile that defines a common phase shift to be imposed upon each of the plurality of phase shifters.

The managing further comprises a first scanning mode of operation, wherein a first region is scanned by managing the imposed phase shifts in the first mode of operation for two or more transmitted beam angles.

The managing further comprises a second scanning mode of operation, wherein a second region is scanned by managing the imposed phase shifts in the second mode of operation for two or more transmitted beam angles.

The first region is a subset of the second region.

The method further comprises receiving scattered light that was emitted from the OPA and estimating a distance to a target based at least in part on a characteristic of the scattered light.

The OPA is a first OPA and the method further comprises receiving the scattered light that was emitted from the first OPA into a second OPA and providing the scattered light for estimating the distance.

Aspects can have one or more of the following advantages.

In a LiDAR system, an optical wave from an optical source can be transmitted using an OPA to target object(s) at a given distance and the light backscattered from the target object(s) can be collected using another OPA. Various techniques, such as modulation and/or time of flight can be used to determine distance to a target object based on information associated with a detection event. The optical source used in such a system can be a laser or other coherent light source, which provides an optical wave that has as narrow linewidth and has a peak wavelength that falls in a particular range (e.g., between about 100 nm to about 1 mm, or some subrange thereof), also referred to herein as simply "light."

In some environments in which a LiDAR system may be used (e.g., automotive environments), or other photonic systems that use transmitter and receiver OPAs, return intensity maps (e.g., representing intensity of collected return light) containing spurious signal peaks associated with side lobes and/or grating lobes of the optical phased array (OPA) radiation patterns can be exacerbated by the ubiquity of retroreflectors (for instance, road signs, road markers, bicycle safety reflectors, registration stickers, etc.), which can produce return signals multiple orders of magnitude higher than those produced by diffusely scattering surfaces. Correspondingly, the return signal associated with the mixing of side lobes or grating lobes at a distant retroflector can readily exceed the noise floor of a phased array LiDAR system, producing a false detection event. The mitigation of this effect is useful for the commercialization of phased array LiDAR technology in the automotive and other application spaces.

In some examples, the photonic systems described herein can be used to probe and measure environments or regions over a wider range of angles than existing implementations. For example, a configuration where grating lobes of a transmitter aperture and a receiver aperture are aligned while the main lobes of the transmitter aperture and the receiver aperture are misaligned can allow scanning over angles outside of regions accessible to the main lobes, as described in more detail below.

Other features and advantages will become apparent from the following description, and from the figures and claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
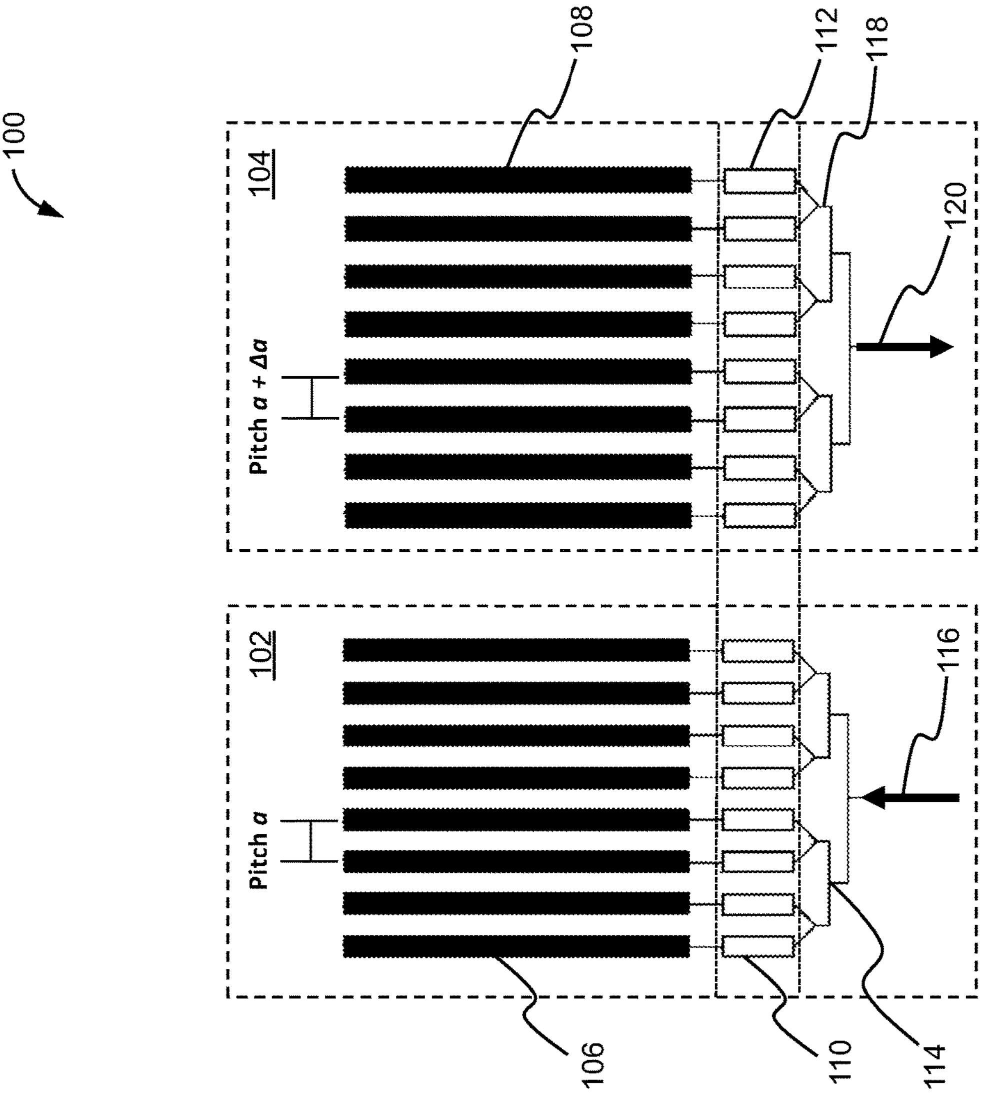
FIG. 1A is a schematic diagram of an example photonic system.

An optical phased array (OPA) can form a steerable optical beam based on the phased array principle. For example, arrays of optical antennas (sometimes referred to as optical emitters) can each emit light with controllable phases (e.g., controlled by phase shifters coupled to the optical antennas), leading to interference patterns that form one or more optical beams. Typically, each optical antenna can also receive light in addition to emitting light. A transmitting OPA can be characterized by an angular intensity distribution, also referred to as a radiation intensity pattern, which may describe the optical beam formed by the transmitting OPA. As such, an optical beam formed by the transmitting OPA may comprise light emitted at one or more angles characterized by the angular intensity distribution. A receiver OPA can receive or collect light that can be used to characterize a scene or a region surrounding the OPAs. The receiver OPA can also be characterized by an angular intensity distribution (radiation intensity pattern), which can also be referred to as a gain pattern. The gain pattern characterizes the angular sensitivity of the receiver OPA to incident light. Both the transmitter angular intensity distribution and the receiver angular intensity distribution may have peaks, also referred to as lobes or array factor peaks, corresponding to local maxima where the respective OPAs have higher transmission power or reception sensitivity. A photonic platform comprising both a receiver OPA and a transmitter OPA may be characterized by a radiation intensity pattern product. In some examples, the radiation intensity pattern product may be determined by multiplying the transmitter radiation intensity pattern and the receiver radiation intensity pattern. In other examples, the radiation intensity pattern product can depend on other factors (e.g., an antenna element factor).

Some of the examples described herein can comprise an OPA with a receiving aperture (i.e., a receiving OPA, a receiving portion, or receiving subsystem) and a transmitting aperture (i.e., a transmitting OPA, a transmitting portion, or a transmitting subsystem). Other examples can comprise separate structures, where the transmitting aperture and receiving aperture are not physically connected together, or are fabricated as stand-alone devices. Furthermore, the transmitting aperture and the receiving aperture may be the same.

In some example implementations, the photonic system described herein may be designed to operate over a determined range of optical wavelengths, for example, the $\lambda$=1500 to 1600 nm band or the $\lambda$=1270 to 1330 nm band, and the base spacing pitch $\alpha$ between the optical antennas may be of similar magnitude to the optical wavelength. For example, for operation in the 1500 to 1600 nm band, 1000 nm$\leq\alpha\leq$2000 nm may be typical. Although all grating lobes would be eliminated if $a<\lambda/2$, a practical lower bound on the grating pitches may be set by the refractive indices of available waveguide materials, as well as by the deleterious impact of waveguide-waveguide coupling when the pitch is reduced. For example, individually single-mode silicon waveguides designed for the 1500 to 1600 nm band, if placed at a pitch of 750 nm to entirely eliminate grating lobes, would couple to each other with a characteristic coupling length between 50 μm and 200 μm; thus phase-depending light redistribution between waveguides would be inevitable and would damage the angular intensity distribution. Therefore, in practical implementations, the presence of grating lobes in the transmitting (TX) radiation pattern and the receiving (RX) gain pattern may occur. However, the grating lobes of the TX OPA and the grating lobes of the RX OPA can be misaligned by applying a uniform pitch mismatch (Aa), element factor engineering, pitch apodization, random pitches, or other methods.

FIG. 1A shows an example optical interface 100 comprising a transmitting OPA 102 and a receiving OPA 104. The transmitting OPA 102 comprises an array of transmitting optical antennas 106 with separations determined by a first pitch a. The receiving aperture comprises an array of receiving optical antennas 108 with separations determined by a second pitch $a+\Delta a$. The transmitting optical antennas 106 and the receiving optical antennas 108 may, for example, be optical gratings or waveguide facets (referred to as an "end-fire array" configuration). The example optical interface 100 further comprises an array of transmitting phase shifters 110 and an array of receiving phase shifters 112, which may be, for example, thermal phase shifters, electro-optical phase shifters, or microelectromechanical phase shifters. In some examples, each of the transmitting phase shifters 110 and each of the receiving phase shifters 112 may be controlled independently. The transmitting phase shifters 110 may modulate the direction and radiation intensity pattern of the transmitted beam emitted from the transmitting OPA 102, and the receiving phase shifters 112 may modulate the receiver radiation intensity pattern (i.e., a gain pattern of the receiver). Transmitter optical power splitters 114 direct an input lightwave 116 into each of the transmitting phase shifters 110 which are optically coupled to respective transmitting optical antennas 106. In this example, the power splitters 114 are connected by waveguides in a binary tree arrangement. A similar or identical binary tree arrangement for receiving optical power combiners 118 combines receiving light into an output lightwave 120 which can then be further manipulated, transformed, or measured. A similar system (not depicted) may also include multiple similar or identical transmitting OPA 102 or receiving OPA 104.

Figure 1B:
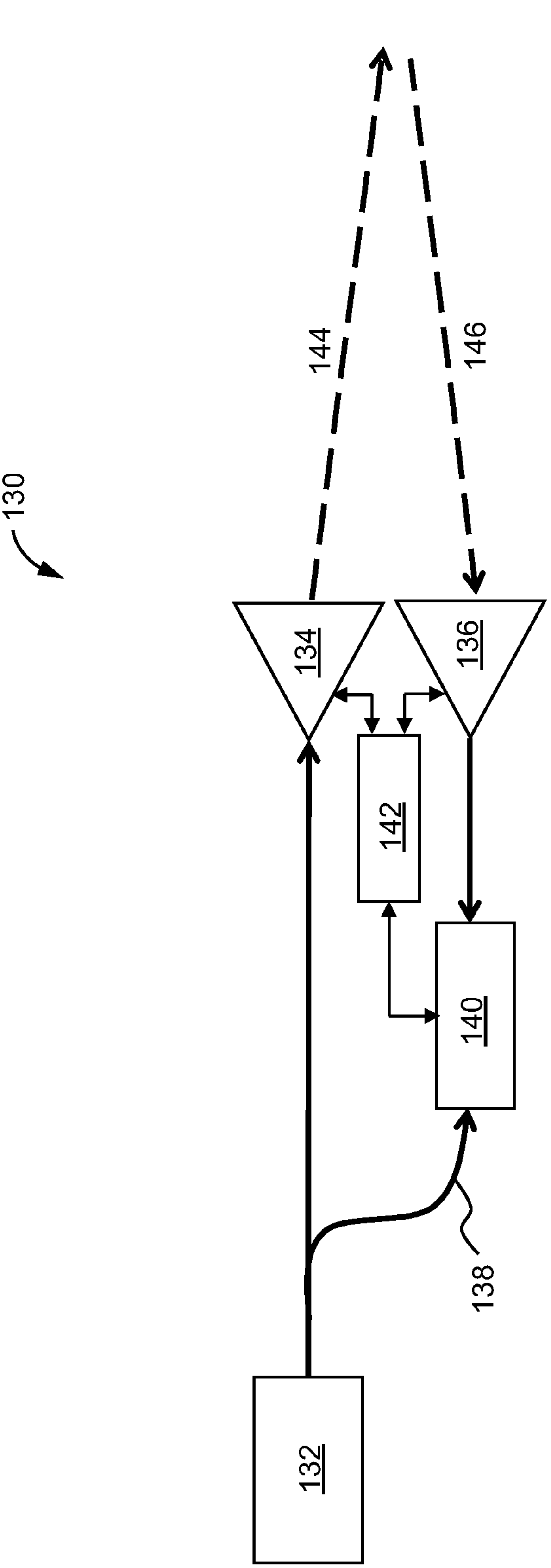
FIG. 1B is a schematic diagram of an example LiDAR system.

FIG. 1B shows an example of a LiDAR system 130 in which an optical interface that uses one or more OPAs, such as the optical interface 100 shown in FIG. 1A, can be used. The LiDAR system 130 includes a laser system 132, a transmitter module 134 configured to transmit light provided by the laser system 132 (e.g., using an OPA) to a target region, and a receiver module 136 configured to receive light (e.g., using an OPA) and coherently mix the received light with light of a local oscillator (LO) 138, which can be derived from the laser system 132, in a coherent detector 140. A control module 142 is configured to control various aspects of the transmitter module 134 and receiver module 136 and to estimate a distance to a target associated with a detection event based at least in part on a characteristic of the scattered light received by the receiver module 136. The laser system 132 can provide a continuous wave (CW) light signal that has a narrow linewidth and low phase noise, for example, sufficient to provide a temporal coherence length that is long enough to perform coherent detection over the time scales of interest. In some implementations, the laser system 132 is a frequency tunable laser system in which the frequency of the light provided can be swept to perform frequency modulated continuous wave (FMCW) LiDAR measurements. A particular transmitting lobe transmission angle 144 from the transmitter module 134 may correspond to a particular receiving lobe collection angle 146 into the receiver module 136, as described in more detail below.

Any of a variety of techniques can be used to steer a transmission angle or reception angle of a lobe of a radiation intensity pattern. Some OPAs have a linear distribution of optical antennas. Steering about a first axis perpendicular to the linear distribution can be provided, for example, by changing the relative phase shifts in phase shifters coupled to each of the optical antennas. Other techniques can be used for steering about a second axis orthogonal to the first axis (e.g., by changing the frequency of the laser system 132).

FIGS. 2A-2E show an example hardware configuration and technique for the mitigation of grating lobe signals in a case where the phase shifters are programmed to produce a linear phase front in the near field (e.g., in which there is a common phase shift used for each of the phase shifters). Another example configuration or mode of operation involving a phase-apodized phase front is described herein. Referring to FIGS. 2A-2E, the misalignment of grating lobes can give rise to a difference in the main lobe to grating lobe angles of their respective array factors. However, the direction of the main lobe can still be controlled, for example, by using the phase shifters coupled to the optical antennas.

Figure 2A:
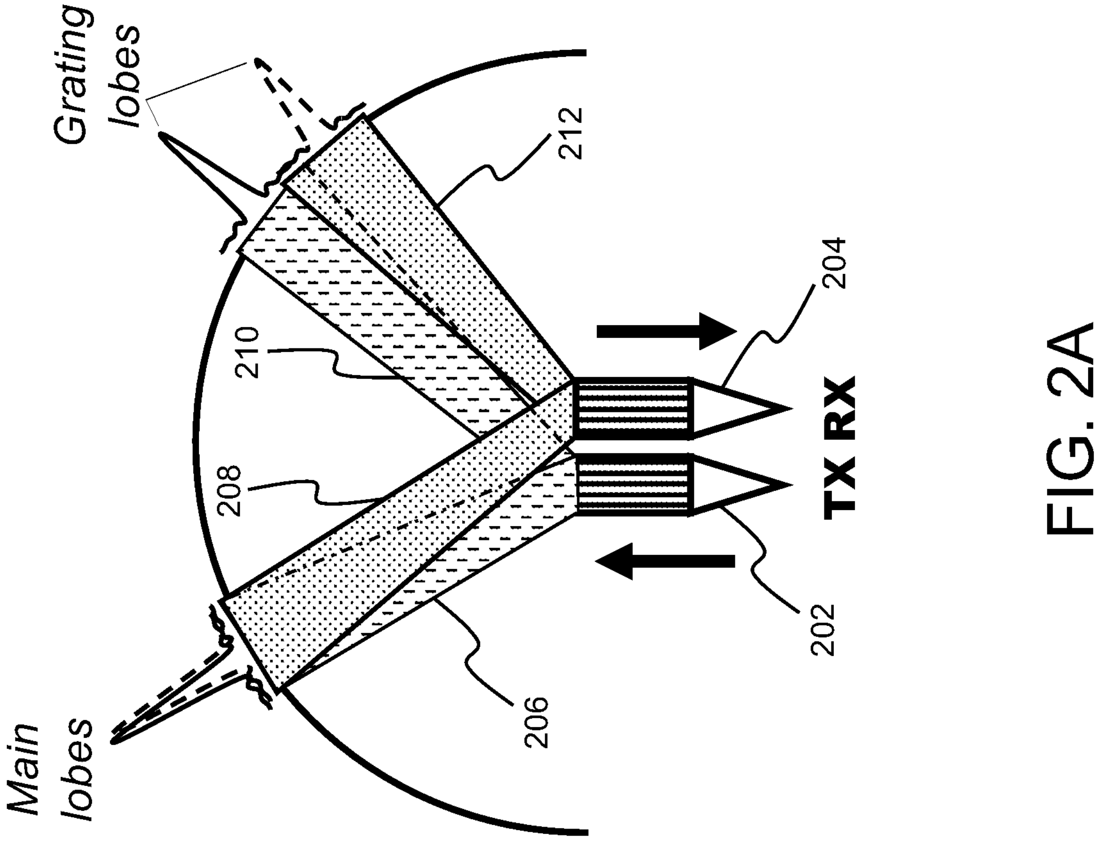
FIG. 2A is a schematic diagram of example radiation intensity patterns for a transmitter OPA and a receiver OPA.

FIG. 2A shows an example radiation intensity patterns for a transmitter OPA 202 and a receiver OPA 204. A transmitter main lobe 206 and a receiver main lobe 208 overlap, whereas a transmitter grating lobe 210 and a receiver grating lobe 212 do not overlap or have substantially less overlap. Such an arrangement of lobe overlaps can result from tuning phase shifters associated with transmitter and receiving optical antennas. In this example, a return signal from an object situated near one of the grating lobes is attenuated due to the reduced overlap.

Figure 2B:
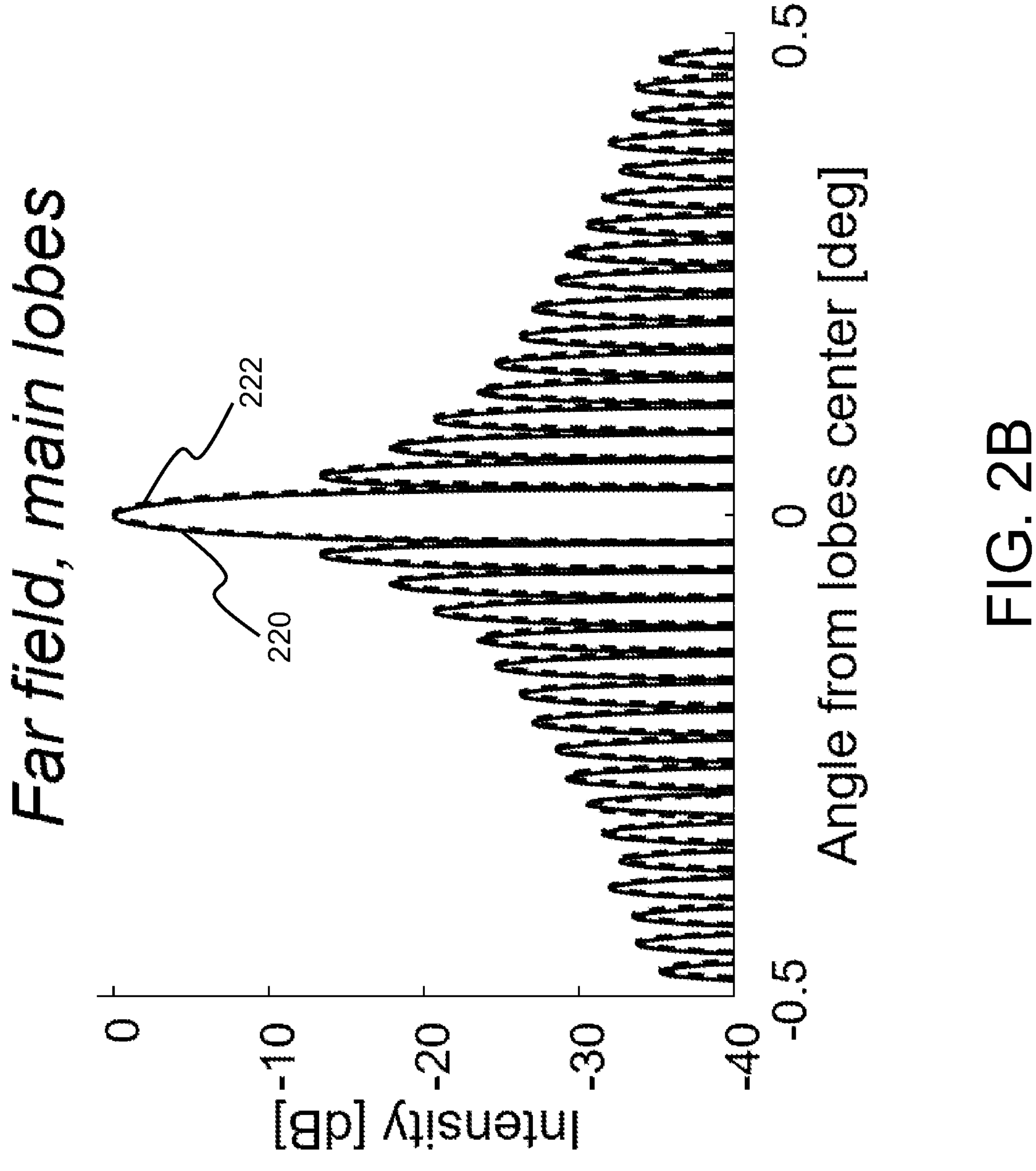
FIG. 2B is a plot of prophetic example radiation intensity patterns for a transmitter OPA and a receiver OPA, as a function of the angle formed with respect to the center of a main lobe.
Figure 2C:
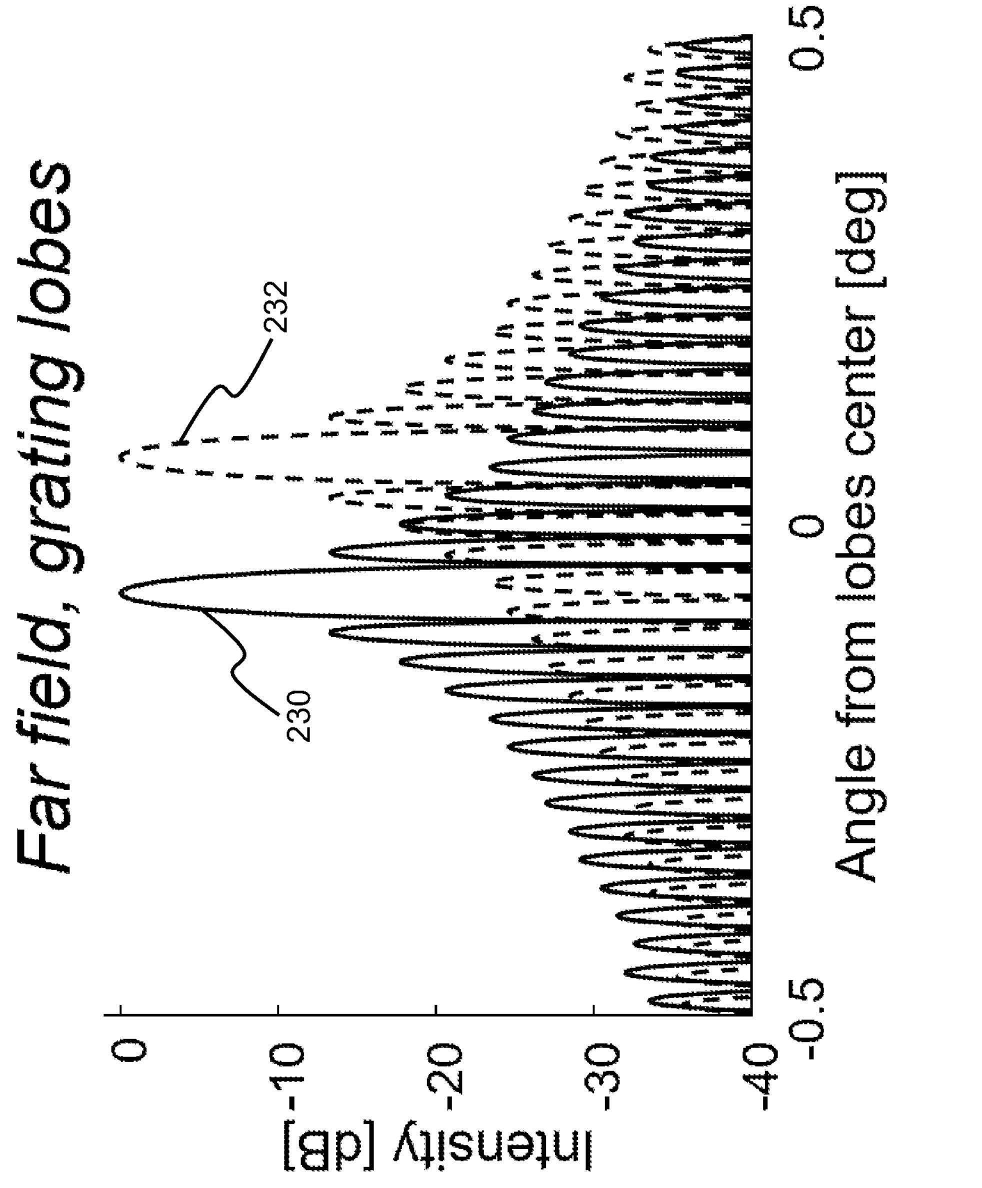
FIG. 2C is a plot of prophetic example radiation intensity patterns for a transmitter OPA and a receiver OPA, as a function of the angle formed with respect to the center of a grating lobe.
Figure 2D:
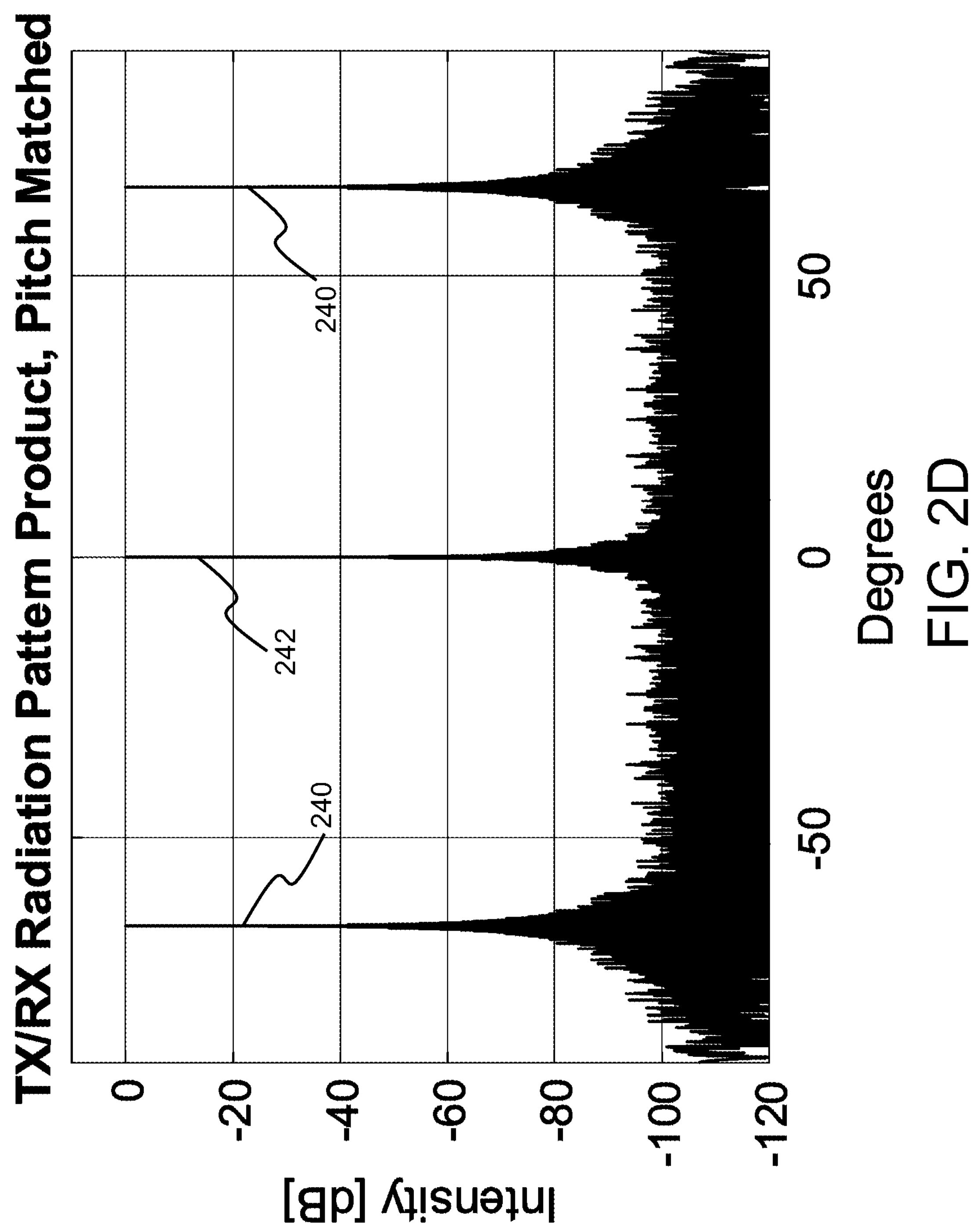
FIG. 2D is a plot of a prophetic example radiation intensity pattern product for a transmitter OPA and a receiver OPA, as a function of the angle formed with respect to boresight, where the grating lobes of the transmitter OPA and the receiver OPA are aligned.
Figure 2E:
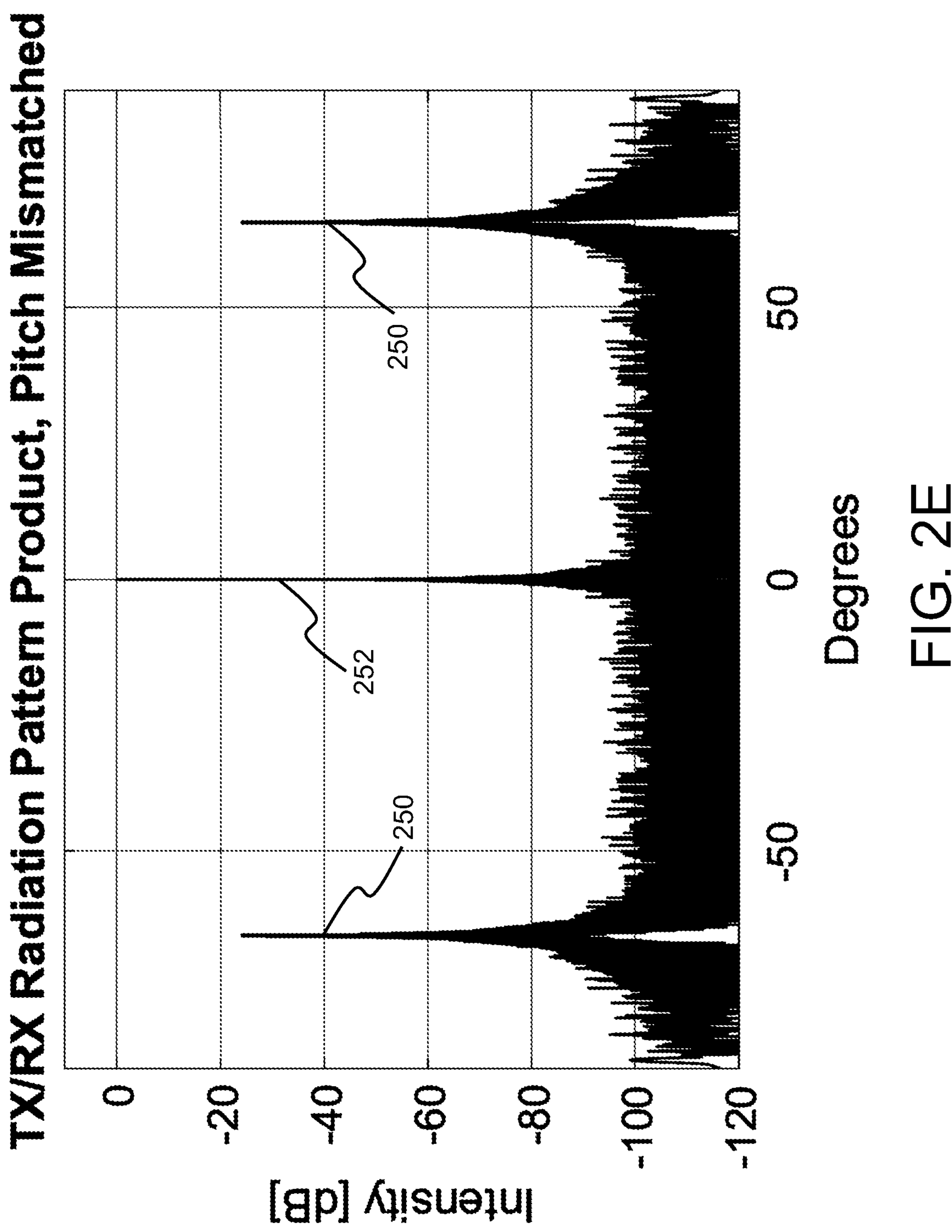
FIG. 2E is a plot of a prophetic example radiation intensity pattern product for a transmitter OPA and a receiver OPA, as a function of the angle formed with respect to boresight, where the grating lobes of the transmitter OPA and the receiver OPA are misaligned.

FIG. 2B, FIG. 2C, and FIG. 2E show, quantitatively, an example in which the TX OPA pitch and RX OPA pitch differ by 4 nm so as to misalign the grating lobes when the main lobes are aligned. FIG. 2D shows, quantitatively, an example in which the TX OPA pitch and RX OPA pitch are the same such that the grating lobes are aligned.

FIG. 2B shows a plot of a prophetic example transmitter radiation intensity pattern 220 (solid line) and an example receiver radiation intensity pattern 222 (dashed line), as a function of the angle with respect to the center of the overlapped main lobes located at 0°.

FIG. 2C shows a plot of a prophetic example transmitter radiation intensity pattern 230 (solid line) and an example receiver radiation intensity pattern 232 (dashed line), as a function of the angle with respect to the midpoint between the misaligned grating lobes located at 0°.

FIGS. 2B-C show the far field TX and RX array factor patterns at the main and grating lobes, respectively, depicting the relative shift of the grating lobes when the main lobes are aligned.

FIG. 2D shows a plot of a prophetic example radiation intensity pattern product for a transmitter OPA and a receiver OPA, as a function of the angle formed with respect to boresight, where grating lobes of the transmitter OPA and the receiver OPA are aligned. The radiation intensity pattern product can be determined by multiplying a transmitter radiation intensity pattern with a receiver radiation intensity pattern. In some examples, other factors can contribute to the radiation intensity pattern product (e.g., an antenna element factor and parallax). Since the pitches of the transmitter OPA and the receiver OPA are the same, the grating lobes of the transmitter OPA and the receiver OPA are aligned, and the main lobes of the transmitter OPA and the receiver OPA are aligned. The aligned grating lobes result in grating intensity peaks 240 that can be of comparable magnitude in radiation intensity to a main intensity peak 242.

FIG. 2E shows a plot of a prophetic example radiation intensity pattern product for a transmitter OPA and a receiver OPA, as a function of the angle formed with respect to boresight, where the grating lobes of the transmitter OPA and the receiver OPA are misaligned. Since the pitches of the transmitter OPA and the receiver OPA differ by 4 nm, the grating lobes of the transmitter OPA and the receiver OPA are misaligned when the main lobes of the transmitter OPA and the receiver OPA are aligned. The misaligned grating lobes result in grating intensity peaks 250 that can be of substantially smaller magnitude in radiation intensity in comparison to a main intensity peak 252.

FIGS. 2D-E demonstrate a 24 dB reduction in return signal from the grating lobe direction of the unmatched case ($\Delta a$=4 nm) compared to the matched case. Generally, a greater $|\Delta a|$ would result in a greater relative reduction of the return signal from the grating lobe.

Figure 3A:
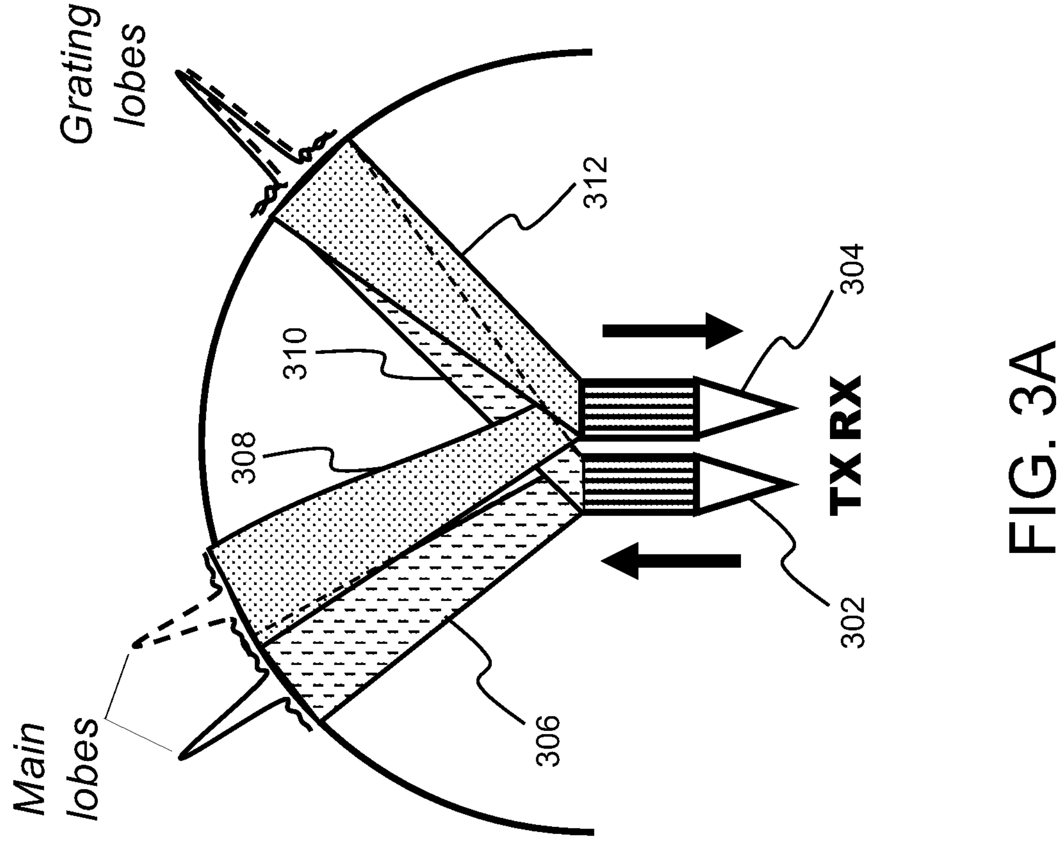
FIG. 3A is a schematic diagram of example radiation intensity patterns for a transmitter OPA and a receiver OPA.
Figure 3B:
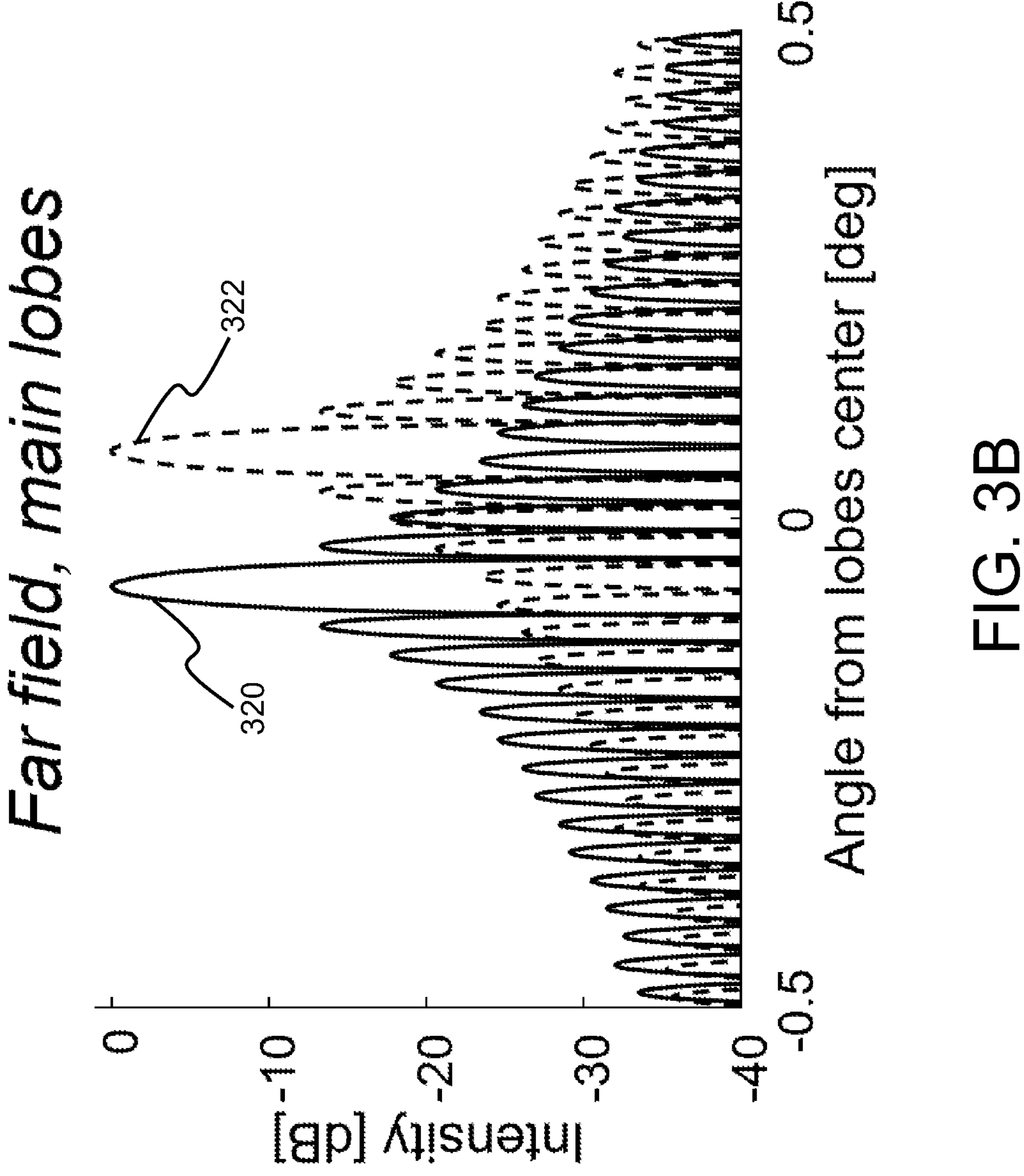
FIG. 3B is a plot of prophetic example radiation intensity patterns for a transmitter OPA and a receiver OPA, as a function of the angle formed with respect to the center of a main lobe.
Figure 3C:
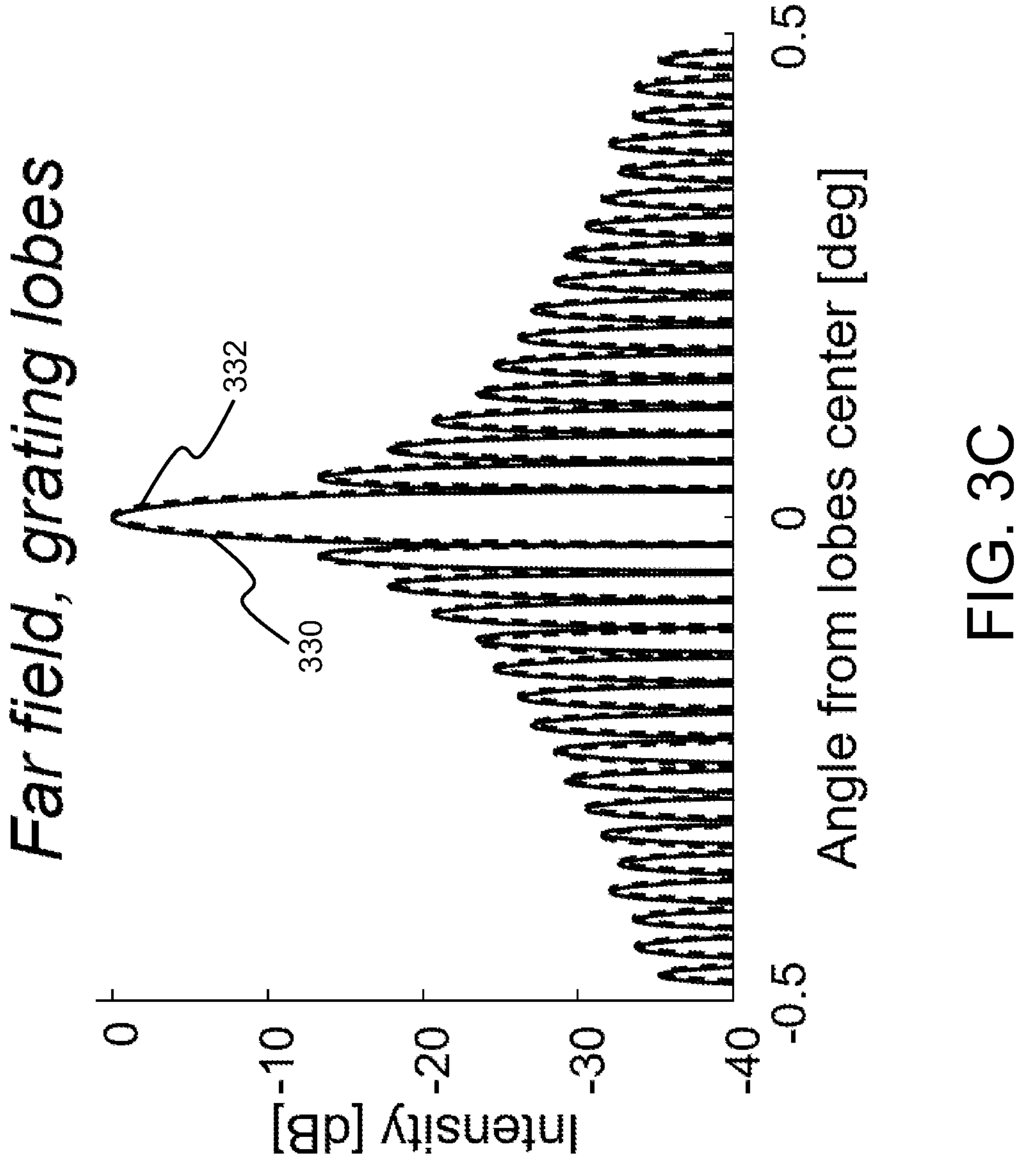
FIG. 3C is a plot of prophetic example radiation intensity patterns for a transmitter OPA and a receiver OPA, as a function of the angle formed with respect to the center of a grating lobe.

FIGS. 3A-3C depict an example of an alternative operating configuration that can be used in some photonic system implementations. In this example, the antenna array phase shifters are programmed so that one or more grating lobes of the TX OPA overlap with one or more grating lobes of the RX OPA, and the main lobe of the TX OPA is misaligned with the main lobe of the RX OPA. In this operating configuration, the LiDAR can be predominantly sensitive to return signals arising from objects within an angular range specified by the grating lobe. The direction of the grating lobe(s) can be controlled, for example, by using antenna phase shifters.

FIG. 3A shows an example radiation intensity patterns for a transmitter OPA 302 and a receiver OPA 304. A transmitter main lobe 306 and a receiver main lobe 308 do not overlap, whereas a transmitter grating lobe 310 and a receiver grating lobe 312 overlap. Thus, a return signal from any object situated at the main lobe is attenuated relative to a return signal from any object situated at the grating lobe.

FIG. 3B shows a plot of a prophetic example transmitter radiation intensity pattern 320 (solid line) and an example receiver radiation intensity pattern 322 (dashed line), as a function of the angle with respect to the midpoint between the misaligned main lobes located at 0°.

FIG. 3C shows a plot of a prophetic example transmitter radiation intensity pattern 330 (solid line) and an example receiver radiation intensity pattern 332 (dashed line), as a function of the angle with respect to the center of the overlapped grating lobes located at 0°.

FIGS. 3B-3C show the far field TX and RX array factor patterns at the main and grating lobes, respectively, depicting the relative shift of the main lobes when the grating lobes are aligned.

Expanding the scope of operation to configurations where the grating lobes align (e.g., FIGS. 3A-3C) adds multiple practical capabilities to the photonic system. First, it effectively expands the "addressable field-of-view" of the system beyond the main lobe range, which has a half-width of $\arcsin(\lambda/2a)$, where $\lambda$ is the wavelength of light and a is the pitch (i.e., distance between optical antennas) of the OPA. Such configurations and techniques allow the OPA-based LiDAR system to uniquely address pointing directions at azimuthal angles $|\theta| \geq \arcsin(\lambda/2a)$. This effectively expands the azimuthal scan range of the device, where in the course of scanning across a scene, first the TX and RX left grating lobes overlap while scanning the left grating lobe range, then the TX and RX main lobes overlap while scanning the main range, then the TX and RX right grating lobes overlap while scanning the right grating range. In general, the user may choose to scan any subset of the full 180° hemisphere in front of the LiDAR unit. Secondly, the ability to uniquely address objects in the main and grating lobes ranges enables a technique of retroflector grating lobe "image" (or "ghost image" or "spurious image") mitigation.

Figure 4:
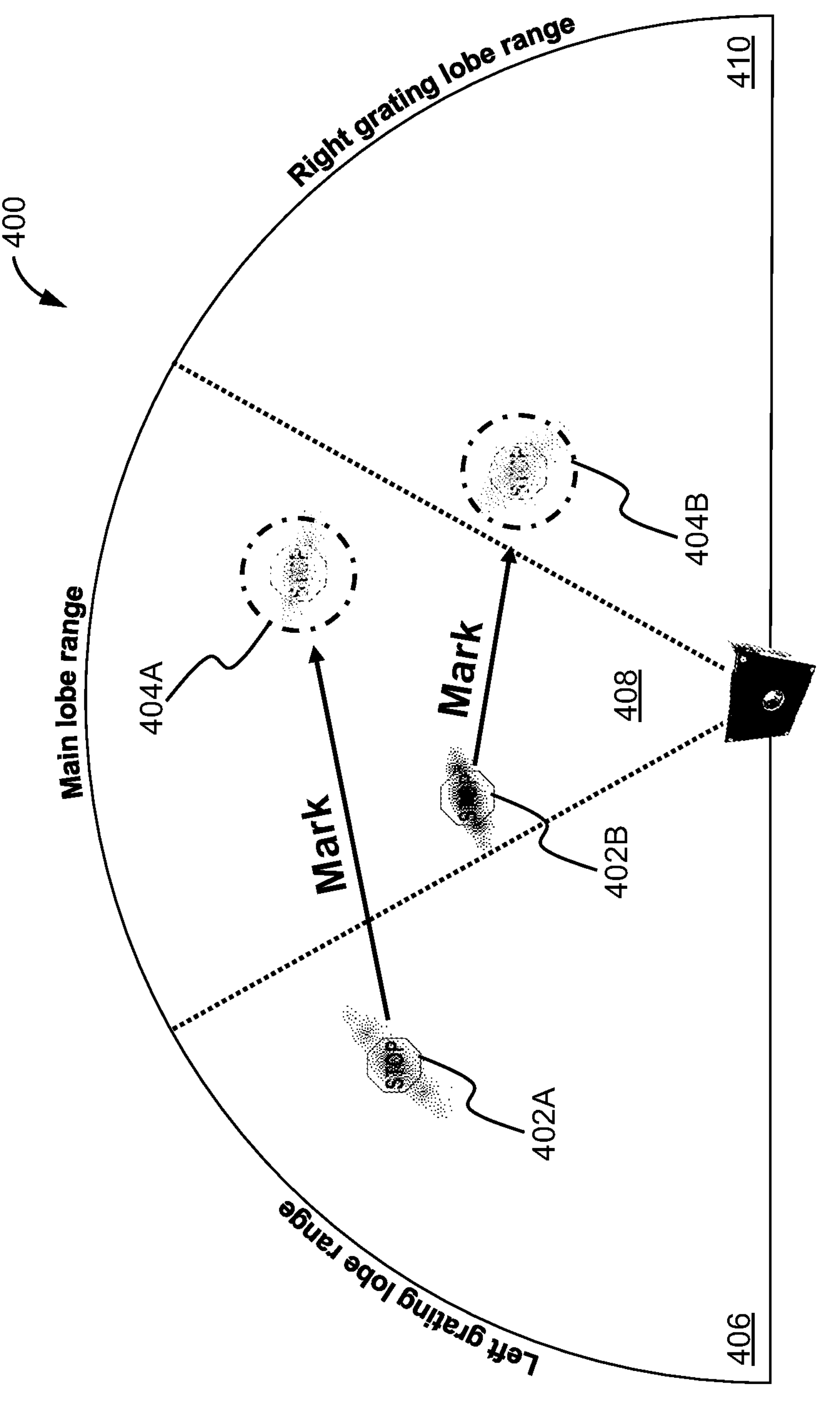
FIG. 4 is a schematic diagram of example spurious image detection and mitigation.

FIG. 4 shows an example of spurious image detection and mitigation. Over the course of scanning a scene 400 using overlapping TX and RX lobes, if a return signal (in some cases a large return signal) is measured in some direction, a model of the system radiation intensity pattern product and antenna element factor can be used to predict the intensity and direction of the spurious "ghost signals" that may arise when partially non-overlapping TX and RX lobes coincide with the physical object producing the reflection and resulting return signal (which can be still be relatively strong despite the reduction due to the misaligned TX and RX lobes). For example, an object 402A (and 402B) can produce a ghost signal 404A (and 404B). The system can then annotate that direction as being affected by grating lobe ghosting, and choose to either ignore that data or locally increase the detection threshold so as to not register the ghost signal 404A alone as a detection event. Such a technique can mitigate the deleterious effects of retroreflectors on application-domain performance in some cases. In other examples, the system can "subtract" out data corresponding to the ghost signal and obtain a substantially ghost-free image.

Using selectively aligned and misaligned TX and RX grating lobes may allow objects in the grating lobe ranges to be uniquely targeted. For example, the left TX and RX grating lobes may be overlapped to scan the left grating lobe range 406, the TX and RX main lobes may be overlapped to scan the main lobe range 408, and the TX and RX right grating lobes may be overlapped to scan the right grating lobe range 410. Directions in which strong return signals are detected can then be used to annotate directions in which spurious "ghosting" images are expected. The data at the points effected by ghosting may then be deleted, or alternatively, the detection threshold at those points may be increased such that the ghosting signal alone does not constitute a detection. In this example, there are two grating lobes, with one on either side of a main lobe, corresponding to three respective ranges corresponding to different portions of the region being scanned. In other examples there may be any number of grating lobes one or both sides of a main lobe, which may lead to more than three respective ranges corresponding to different portions of the region being scanned.

FIGS. 1, 2A, 3A, and 4 together illustrate different aspects of a first example method for imaging a region. The first example method for imaging a region comprises providing light (e.g., input lightwave 116) to a plurality of optical antennas (e.g., transmitting optical antennas 106) separated by a first set of spacings (e.g., pitch $\alpha$, for a case in which the spacings are all equal) in a first optical phased array (e.g., transmitting OPA 102), wherein phases of light provided to respective optical antennas are controlled (e.g., by an array of transmitting phase shifters 110) to form a transmitted beam from the first OPA. The transmitted beam is characterized by a first angular intensity distribution that comprises a first lobe (e.g., transmitter main lobe 206, transmitter main lobe 306) and a second lobe (e.g., transmitter grating lobe 210, transmitter grating lobe 310). The first example method for imaging a region further comprises steering an angle of the beam so that the first lobe of the first angular intensity distribution scans over a first portion of the region (e.g., main lobe range 408), and the second lobe of the first angular intensity distribution scans over a second portion of the region (e.g., left grating lobe range 406, right grating lobe range 410). The first example method for imaging a region further comprises receiving light from a plurality of optical antennas (e.g., receiving optical antennas 108) separated by a second set of spacings (e.g., pitch $\alpha+\Delta\alpha$) in a second OPA (e.g., receiving OPA 104), wherein at least one spacing in the second set of spacings is different from at least one spacing in the first set of spacings, and wherein phases of light provided to respective optical antennas are controlled (e.g., by an array of receiving phase shifters 112) to receive light into the OPA from different directions associated with a second angular intensity distribution that comprises a first lobe (e.g., receiver main lobe 208, receiver main lobe 308) and a second lobe (e.g., receiver grating lobe 212, receiver grating lobe 312). The phases of the first OPA and the phases of the second OPA are configured so that the first lobe of the first angular intensity distribution and the first lobe of the second angular intensity distribution substantially overlap in angle (e.g., as shown in FIG. 2A) during the scan of the first lobes over the first portion of the region, and the second lobe of the first angular intensity distribution and the second lobe of the second angular intensity distribution substantially overlap in angle (e.g., as shown in FIG. 3A) during the scan of the second lobes over the second portion of the region.

FIGS. 1, 2A, 3A, and 4 together illustrate different aspects of a second example method for imaging a region. The second example method for imaging a region comprises providing light (e.g., input lightwave 116) to a plurality of optical antennas (e.g., transmitting optical antennas 106) separated by a first set of spacings (e.g., pitch $\alpha$) in a first optical phased array (e.g., transmitting OPA 102), wherein phases of light provided to respective optical antennas are controlled (e.g., by an array of transmitting phase shifters 110) to form a transmitted beam from the first OPA. The transmitted beam is characterized by a first angular intensity distribution that comprises a first lobe (e.g., transmitter main lobe 206, transmitter main lobe 306) and a second lobe (e.g., transmitter grating lobe 210, transmitter grating lobe 310). The second example method for imaging a region further comprises steering an angle of the beam so that the first lobe of the first angular intensity distribution scans over a first portion of the region (e.g., main lobe range 408), and the second lobe of the first angular intensity distribution scans over a second portion of the region (e.g., left grating lobe range 406, right grating lobe range 410). The second example method for imaging a region further comprises receiving light from a plurality of optical antennas (e.g., receiving optical antennas 108) separated by a second set of spacings (e.g., pitch $\alpha+\Delta\alpha$) in a second OPA (e.g., receiving OPA 104), wherein at least one spacing in the second set of spacings is different from at least one spacing in the first set of spacings, and wherein phases of light provided to respective optical antennas are controlled (e.g., by an array of receiving phase shifters 112) to receive light into the OPA from different directions associated with a second angular intensity distribution. The second example method for imaging a region further comprises characterizing potential detection events (e.g., ghost signal 404A) during the scan of the first lobe of the first angular intensity distribution over the first portion of the region based at least in part on whether or not a detection event (e.g., object 402A) was detected during the scan of the second lobe of the first angular intensity distribution over the second portion of the region at a beam angle associated with the potential detection event.

In the examples depicted in FIGS. 2A-E and FIGS. 3A-C, the phases shifters addressing each TX and RX antenna are set to produce near-flat phase fronts in the near field of the TX and RX apertures. In other examples, the phase shifters can be configured to produce other, non-flat, phase fronts in the near field.

Figure 5A:
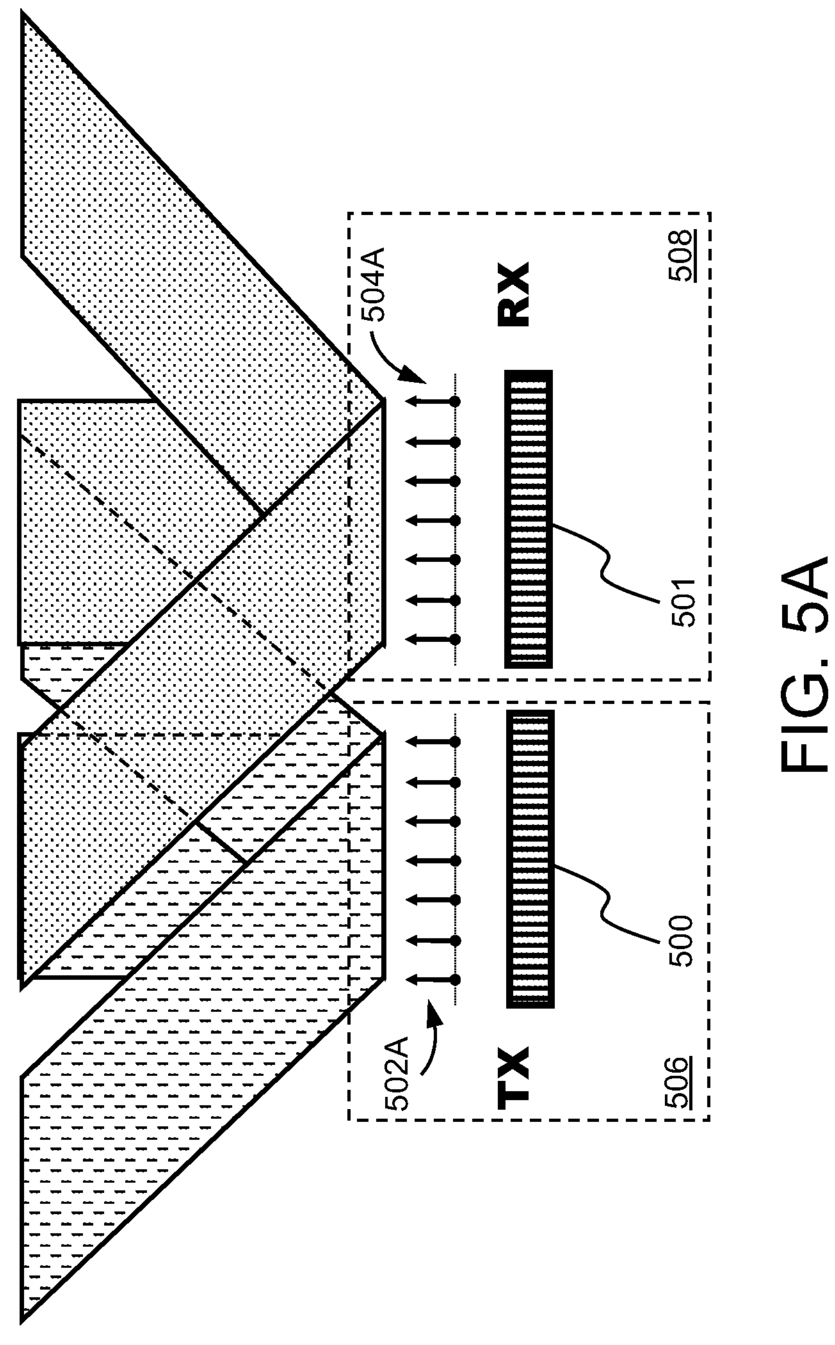
FIG. 5A is a schematic diagram of an example photonic system in the near field.

FIG. 5A shows a schematic diagram of an example transmitter optical phased array (TX OPA) 500, configured to produce a near-flat transmitter phase front corresponding to a distribution of phases 502A in the near field of a beam transmitted from a transmitter aperture 506, and an example receiver optical phased array (RX OPA) 501, configured to receive a near-flat receiver phase front corresponding to a distribution of phases 504A in the near field of light received at a receiver aperture 508. The arrows illustrated in association with the near field phase front of the transmitted beam represent the relative phase shifts applied by phase shifters to the optical field emitted from the optical antennas of the TX OPA 500. The arrows illustrated in association with the near field phase front of the received beam represent the relative phase shifts applied by phase shifters to the optical field received at the optical antennas of the RX OPA 501. In this example, three lobes start to emerge as the optical field starts to transition from the near field to the far field for each OPA, corresponding to the main lobe and a grating lobe on each side of the main lobe.

Figure 5B:
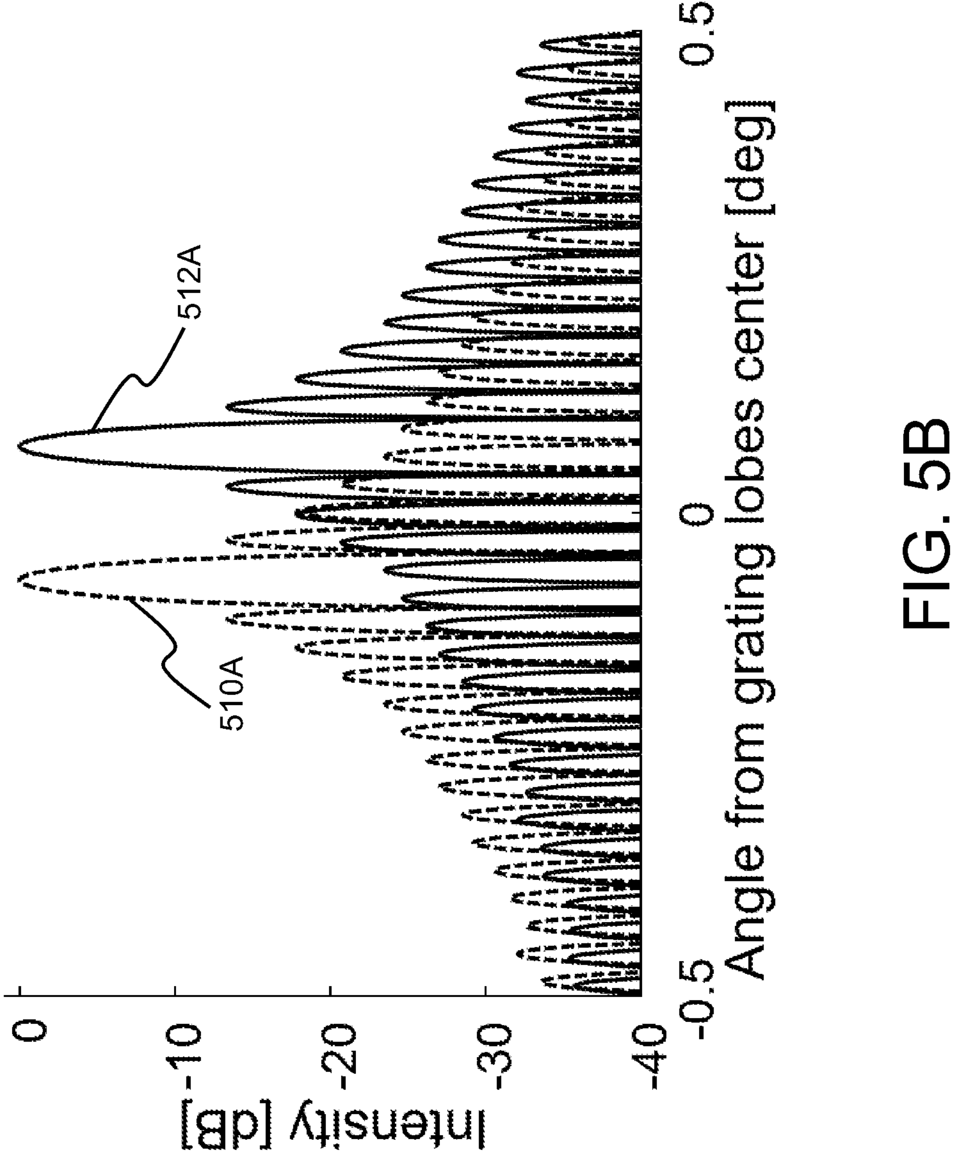
FIG. 5B is a plot of prophetic example radiation intensity patterns for a transmitter OPA and a receiver OPA, as a function of the angle formed with respect to the center of a grating lobe.

FIG. 5B shows a plot of a prophetic example transmitter radiation intensity pattern 510A (dashed line) for a transmitter optical phased array and a prophetic example receiver radiation intensity pattern 512A (solid line) for a receiver optical phased array, as a function of the angle with respect to the midpoint between the peaks of the grating lobes. Referring to FIG. 5A, if optical power is substantially uniformly distributed across antennas in the transmitter aperture 506, and uniformly collected from the antennas in the receiver aperture 508, for example by using binary splitter trees, the transmitter optical phased array 500 and the receiver optical phased array 501 may produce the sinc-squared radiation intensity patterns shown in FIG. 5B. Referring to FIG. 5B, the possibly slow falloff of the sinc-squared profile may limit the relative attenuation of ghost images located at the misaligned TX and RX grating lobes with respect to the main lobes. This disadvantage may be true for splitter networks other than binary trees that, for example, produce slow falloffs in the far field due to the near field amplitude profile.

Figure 5C:
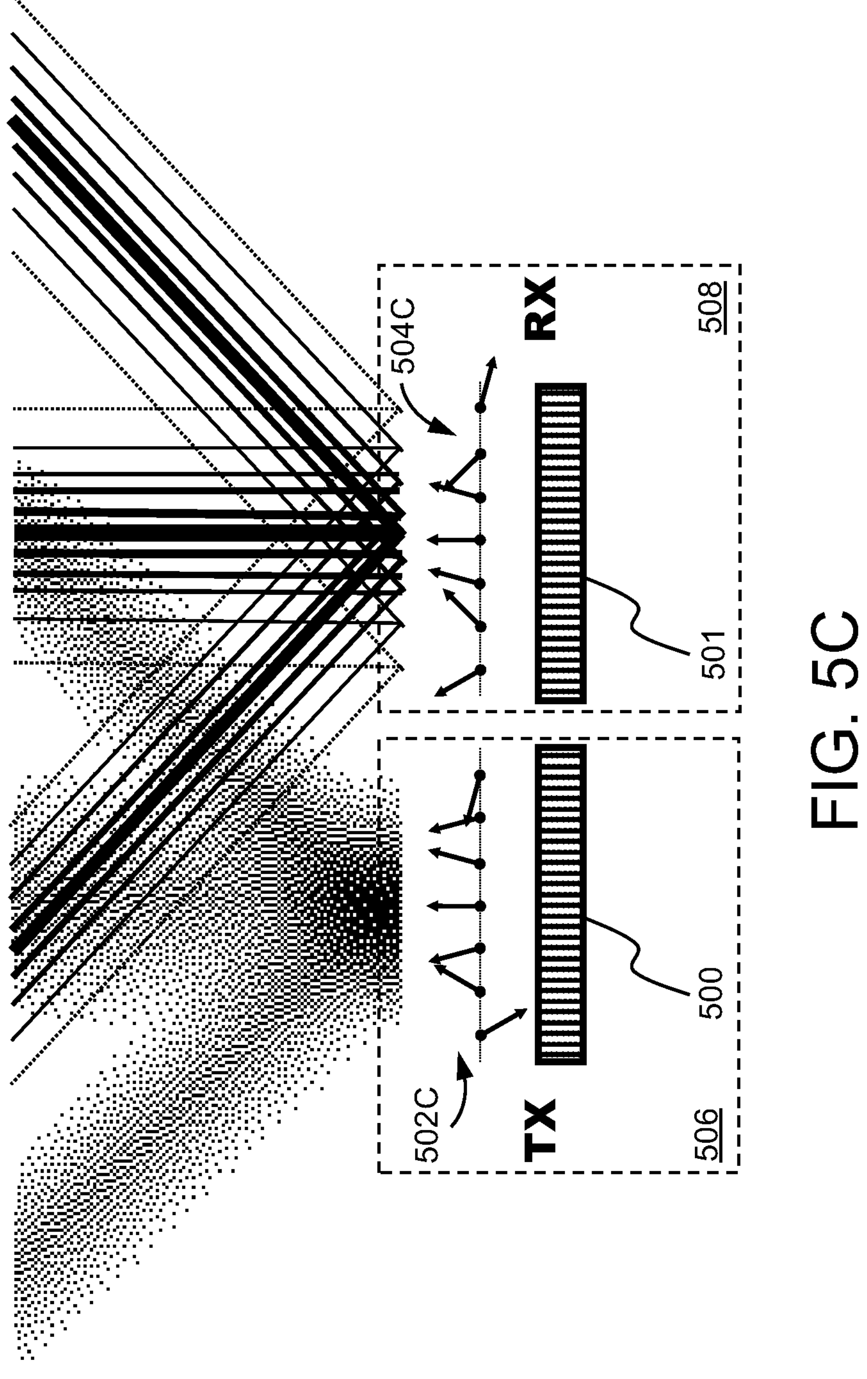
FIG. 5C is a schematic diagram of an example photonic system in the near field.
Figure 5D:
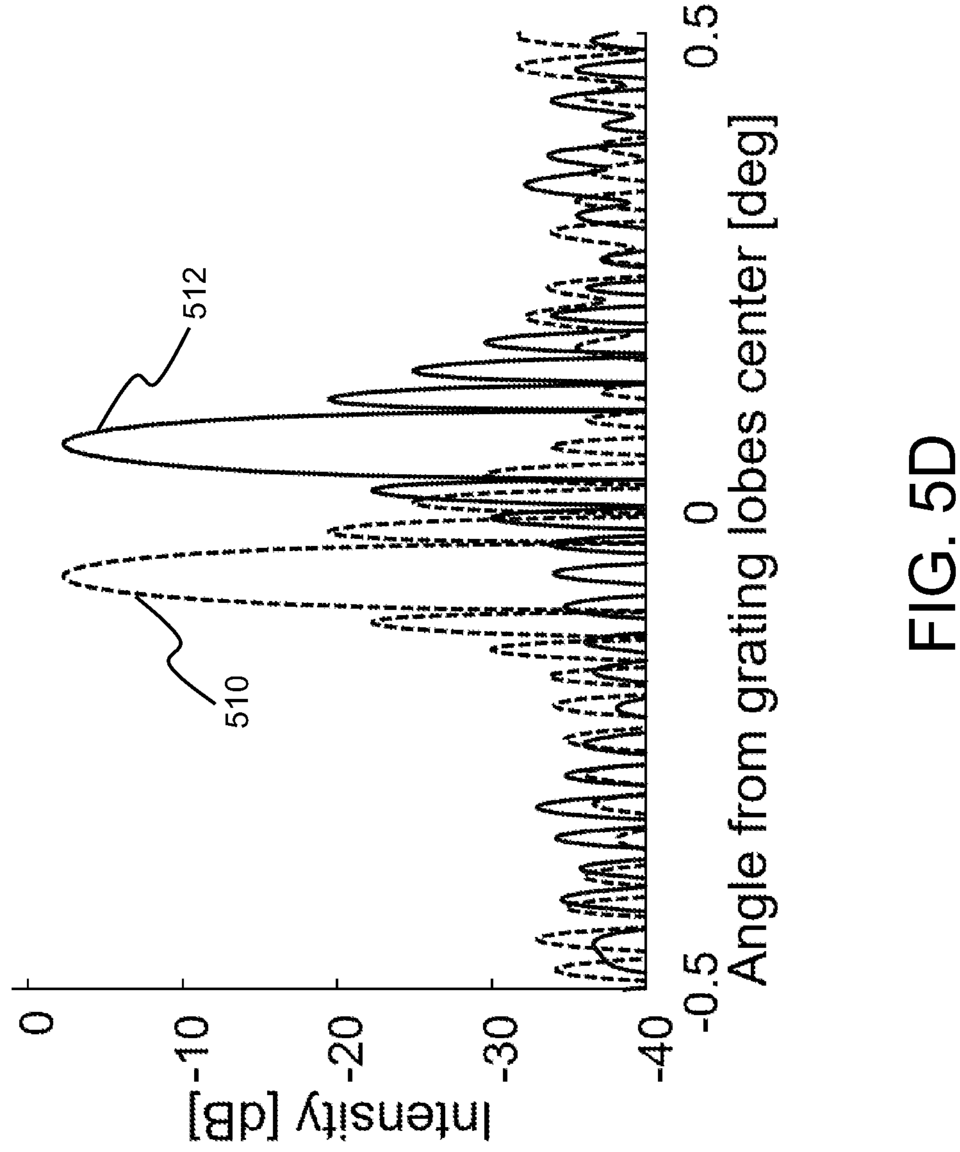
FIG. 5D is a plot of prophetic example radiation intensity patterns for a transmitter OPA and a receiver OPA, as a function of the angle formed with respect to the center of a grating lobe.

FIGS. 5C-D show an additional mode of operation that can be used in some implementations to further reduce the effect of ghost images.

FIG. 5C shows a schematic diagram of an example in which phase shifters are configured to produce a spatially varying transmitter phases 502C, and a spatially varying receiver phases 504C, in the near field of the transmitter aperture 506 and the receiver aperture 508. The spatially varying phase shifts applied by the phase shifters result in a near field profile with a smooth, gradual falloff towards the edges of the aperture.

FIG. 5D shows a plot of a prophetic example transmitter radiation intensity pattern 510C (dashed line) for a transmitter optical phased array and a prophetic example receiver radiation intensity pattern 512C (solid line) for a receiver optical phased array, as a function of the angle with respect to the midpoint between the peaks of the grating lobes. The far field beam profiles correspond to the configuration shown in FIG. 5C, and exhibit a sharper roll-off away from the array factor peak. In some examples, the near field phases can be designed such that for a sufficient grating lobe misalignment, the relative attenuation of a ghost signal with respect to the main signal can be reduced even further compared to the sinc-squared falloff case shown in FIG. 5B. In some examples, the near field phase misalignment can reduce the main lobe's peak intensity, imposing a small link penalty on the overall return signal of the system. A representative value of this penalty can be between 0 and 10 dB. However, for some phase front configurations, the relative attenuation of the ghost signal can greatly exceed the induced link penalty, in some cases by 10 dB or more.

In general, the different phase apodization techniques described herein can be used to improve peak rolloff and reduce ghosting (e.g., the contribution of a ghost signal to the received signal, where the ghost signal is the result of reflection from an object outside of the region being scanned by the intended lobe). Furthermore, the different phase apodization techniques can be realized in various implementations. Two potential manifestations—example algorithms to determine suitable phases to apply to each antenna—are described as follows.

Figure 6A:
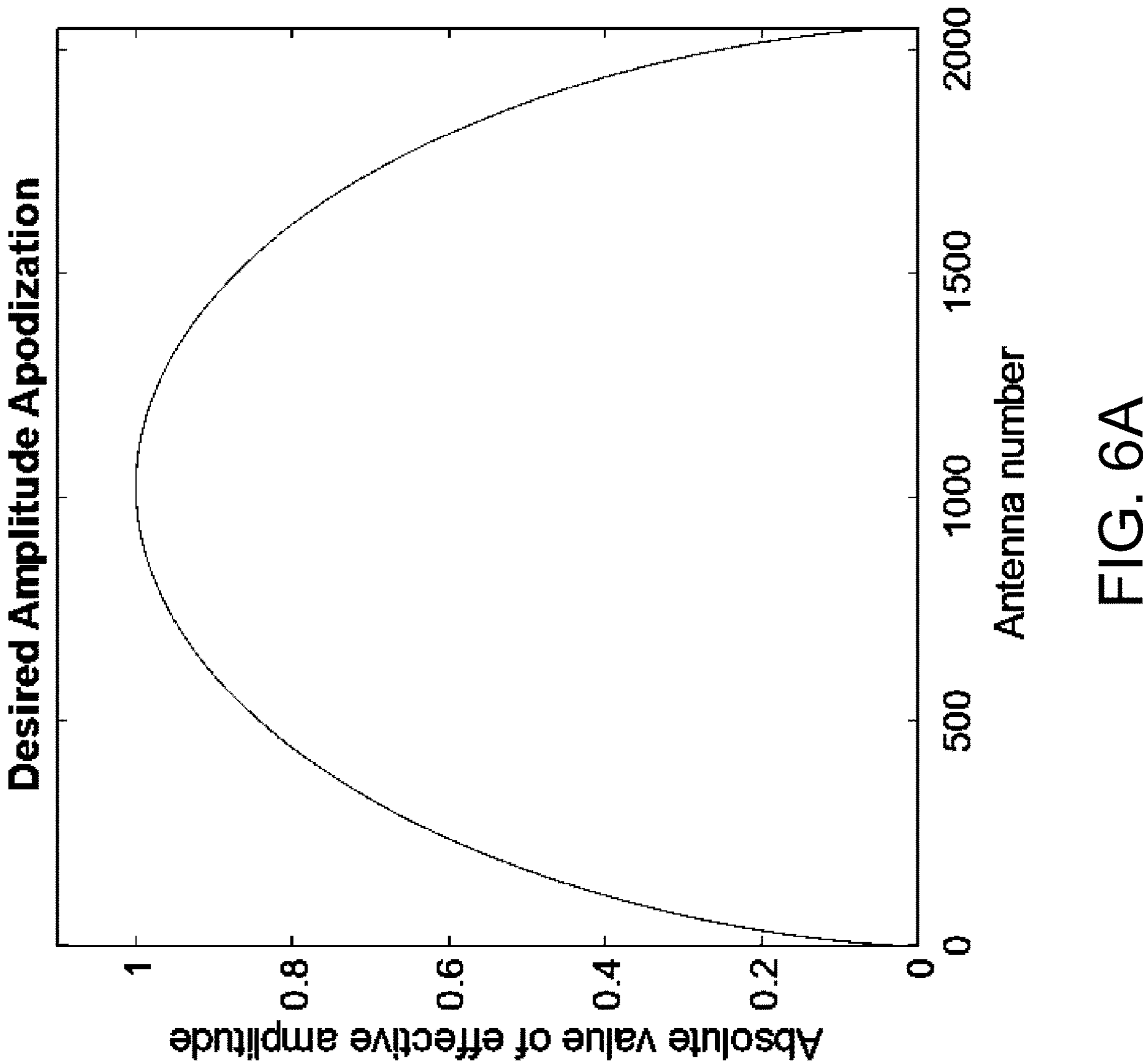
FIG. 6A is a plot of a prophetic example absolute value of effective amplitude for apodization as a function of the antenna number, where the antenna number corresponds to the relative location of each antenna in an optical phased array.

FIG. 6A is a plot of a prophetic example absolute value of effective amplitude for apodization as a function of the antenna number, where the antenna number corresponds to the relative location of each antenna in an optical phased array.

Figure 6B:
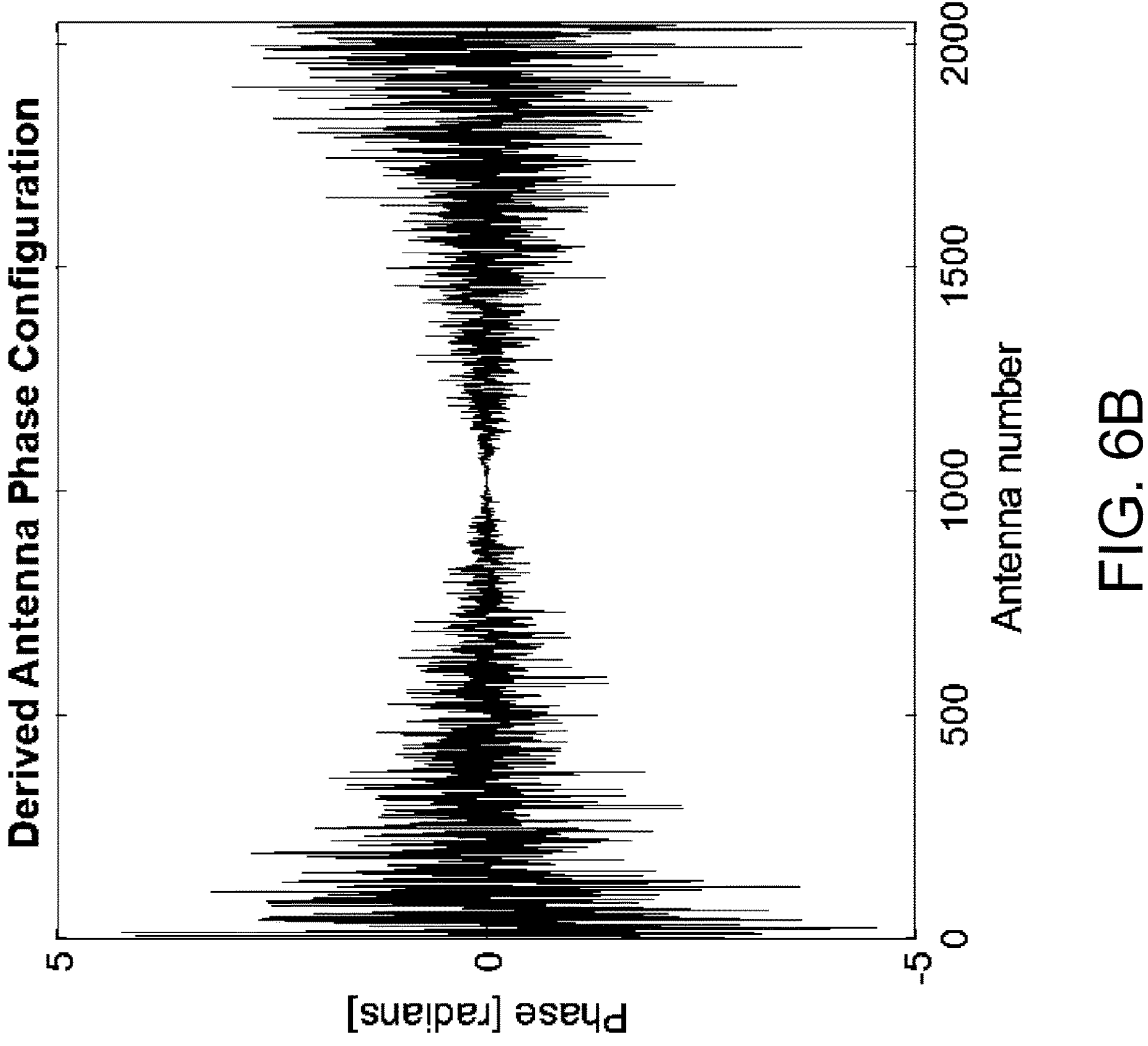
FIG. 6B is a plot of a prophetic example phase for apodization as a function of the antenna number, where the antenna number corresponds to the relative location of each antenna in an optical phased array.

FIG. 6B is a plot of a prophetic example phase for apodization as a function of the antenna number, where the antenna number corresponds to the relative location of each antenna in an optical phased array.

FIGS. 6A-B show an example of apodization by applying random phases to each antenna in a transmitter OPA (TX) and a receiver OPA (RX), where each phase is chosen from a suitable probability distribution (e.g., a Gaussian probability distribution) with a varying standard deviation over the width of the respective aperture, using a suitable function for generating random values (e.g., using a pseudorandom number generating function). The procedure for this example is as follows. First, a desired "effective amplitude apodization" profile, shown in FIG. 6A, is chosen for the TX and RX apertures. The design of this apodization profile can be similar to the design of a finite impulse response low pass filter, insofar as the result, namely the far field profile, may be the Fourier transform of a finite list of values. In some implementations, finite impulse response design procedures may be used for this step. Second, for each antenna, a phase is randomly chosen from a Gaussian distribution with zero mean and standard deviation $\sigma = \text{sqrt}[-2 \ln(A)]$, where A is the value of the effective amplitude apodization profile at that antenna, and ln is the natural logarithm.

FIG. 6B shows a plot of a prophetic example of such an antenna phase profile. The antenna phase configuration shown in FIG. 6B produces a far field profile whose side lobe intensities are approximately equal to those that would result if the emission magnitudes of the antennas were apodized with the designed amplitude profile shown in FIG. 6A, as opposed to the emission phases as is shown in FIG. 6B. The far field profile in shown in FIG. 5D was produced using this methodology (e.g., the antenna phase configuration shown in FIG. 6B).

Another example methodology to determine the antenna phase configuration involves solving an optimization problem incorporating a calibrated model of each individual OPA LiDAR system, where the optimization figure of merit can be the minimization of ghosting intensity (i.e., minimization of the TX/RX radiation intensity pattern product in the non-coincident regions) constrained by an acceptable amount of attenuation in the radiation intensity pattern product peak or main lobe. A particularly desirable solution to this optimization problem may result in a deep, >10 dB dip in the RX pattern noise floor coinciding with the TX peak in the non-coincident region, and a >10 dB dip in the TX pattern noise floor coinciding with the RX peak in the non-coincident region, thus resulting in a TX/RX radiation intensity pattern product with highly attenuated ghosting.

The phase apodization described in FIGS. 6A-B may result in additional benefits. For example, such phase apodization may lead to the narrowing of the main peak of the TX/RX radiation intensity pattern product, as shown in FIG. 7.

Figure 7:
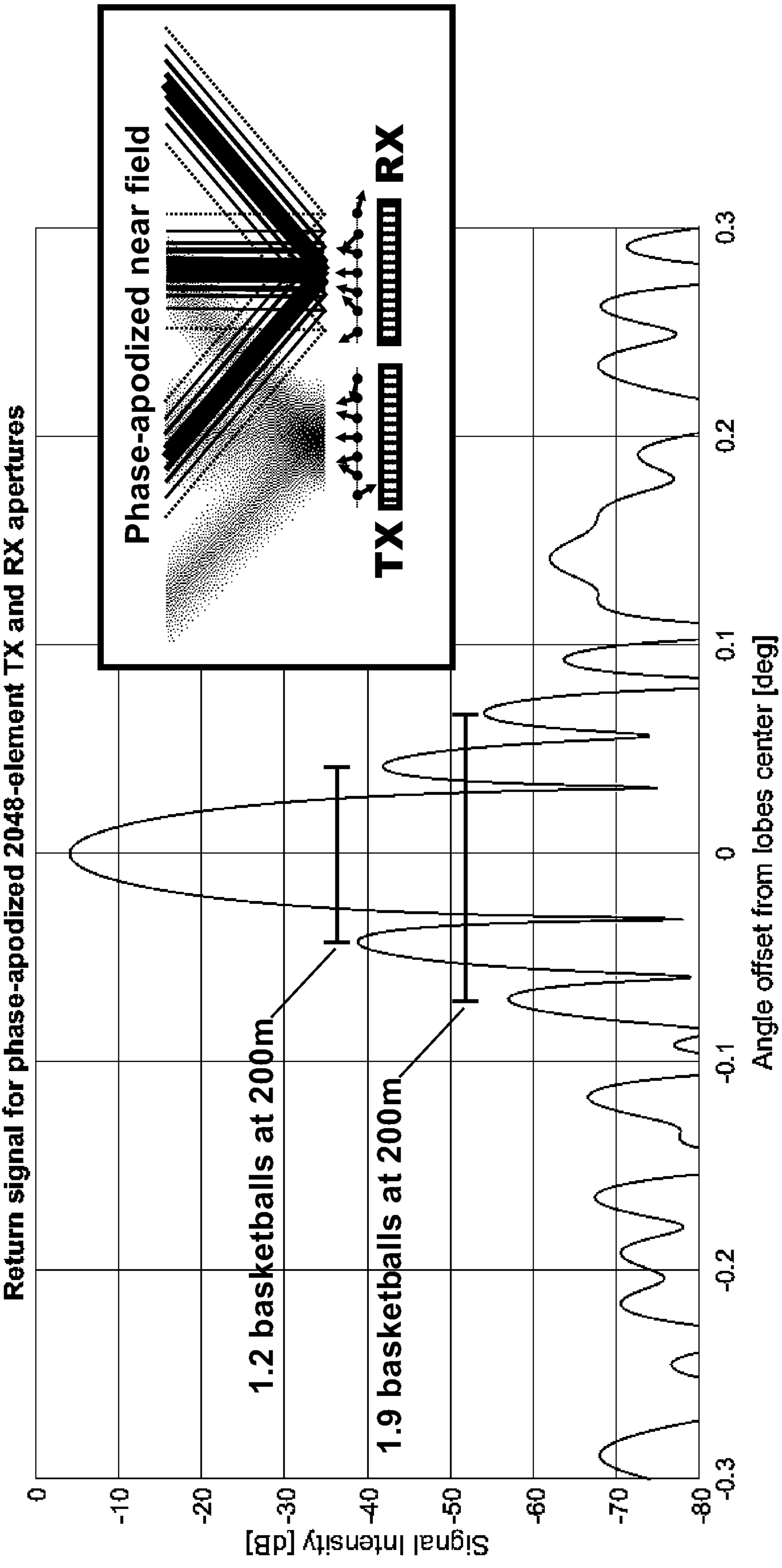
FIG. 7 is a plot of a prophetic example radiation intensity pattern product, with apodization, for a transmitter OPA and a receiver OPA, as a function of the angle formed with respect to the center of a lobe.

FIG. 7 shows a plot of a prophetic example radiation intensity pattern product, with apodization, for a transmitter OPA and a receiver OPA, as a function of the angle with respect to the peak of the intensity pattern product. Compared to the unapodized, linear phase front case, in which the center lobe at 0° can have ~10 side lobes on each side that rise above the noise floor, phase apodization reduces this number to 2 sides lobes on each side for the 2048-element TX and RX arrays in this example. The reduced number of side lobes, in turn, reduces the azimuthal width of spurious signals associated with the coincidence of these side lobes upon strong reflectors. The practical manifestation of this impact is that the "apparent width" of retroreflectors, which in the unmitigated case may be many times wider than their physical width, may be reduced considerably. In FIG. 7, distances between side lobes are expressed in terms of angle offset relative to the center in degrees on the horizontal axis, and relative widths are compared in terms of arbitrary units (labeled as basketball-diameters at a range of 200 m).

Due to the link penalty associated with phase apodization, the practical application of the mitigation techniques may involve switching between non-phase-apodized phase near field phase profile (e.g., a linear phase profile based on a common phase shift or other deterministic phase profile, such as lensed linear/parabolic phase profile, that does not use a probability distribution or pseudorandom function) and phase-apodized near field phase profiles depending on the circumstances. For example, the OPA LiDAR presently described may be operated in a linear/lensed linear mode during the initial scan of a scene. In regions of the scene where retroreflectors (e.g., recognized by strong return signal compared to a predetermined threshold) or ghosting (annotated at known angles to the left and right of strong return signals) are suspected, the system may reconfigure the phase shifters to produce a phase-apodized near field phase front and rescan the affected regions, reaping the benefits of reduced side lobe overlap in the former (near retroreflector) case and reduced offset-peak overlap in the latter (at ghosting) to increase the sensitivity to weaker return signals that may be otherwise masked by the spurious return signals. Since the proportion of a scene affected by retroreflectors is expected to be quite low, for instance <5%, a similarly low amount of temporal overhead is expected in the rescanning process.

FIGS. 1 and 6B together illustrate different aspects of an example apparatus. The example apparatus comprises an optical phased array (e.g., transmitting OPA 102) comprising a plurality of optical antennas (e.g., transmitting optical antennas 106) separated by a set of spacings (e.g., pitch $\alpha$) and a plurality of phase shifters (e.g., transmitting phase shifters 110) configured to impose phase shifts onto light provided to respective optical antennas of the plurality of optical antennas. A phase shift control module is configured to manage the imposed phase shifts, the managing comprising a first mode of operation. The phase shift control module may provide analog electrical signals to the plurality of phase shifters. For example, a computer processing unit (CPU) may be located in proximity to and electrically connected the plurality of phase shifters. A digital-to-analog converter (DAC) may be used to transform digital signals from example phase shift control modules into analog signals that are then sent to the plurality of phase shifters. In other examples, an application-specific integrated circuit (ASIC) may be used as a phase control module. The first mode of operation comprises, for a first subset of optical antennas within a distance from a center of the plurality of optical antennas (e.g., antennas with antenna numbers between 800 and 1200 in FIG. 6B), determining variations of imposed phase shifts smaller than a phase shift variation range, and for a second subset of optical antennas further than the distance from the center of the plurality of optical antennas (e.g., antennas with antenna numbers less than 800 and greater than 1200 in FIG. 6B), determining variations of imposed phase shifts larger than the phase shift variation range.

In some implementations, OPA LiDAR can use multiple receiver OPAs to capture the light from one or more transmitter OPAs (e.g., multiple transmitters in a multistatic configuration). In this case, additional measures may be taken to identify or suppress retroreflections. For instance, a subset of the receive apertures may be configured to overlap with the main lobe of the transmitter beam while the remainder of the receiver apertures are configured to overlap with the grating lobe. In this case, the receiver apertures configured to overlap in the grating lobes may be monitored for strong returns, and used to reject the ghost returns that show up in the receiver apertures configured to overlap with the TX beam's main lobe.

Multistatic LiDARs may also contain information that can be used to identify and reject retroreflections with some or all receiver apertures configured to overlap with the transmitter's main lobe. Prior to reaching the far-field, the offset between transmitter and receiver may cause loss at the receiver due to the parallax error between the transmitter and receiver. That loss may be based on geometry and may be calculated assuming that the target object is located at the transmitter's main lobe or also at the transmitter's grating lobes, as shown in FIG. 8.

Figure 8:
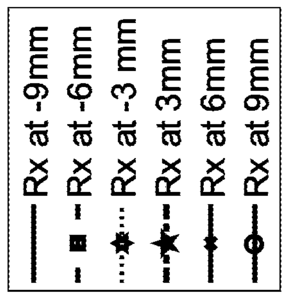
FIG. 8 is a plot of prophetic example parallax errors, as a function of the angle of a target with respect to a transmitter OPA, for various photonic system configurations.
Figure 8:
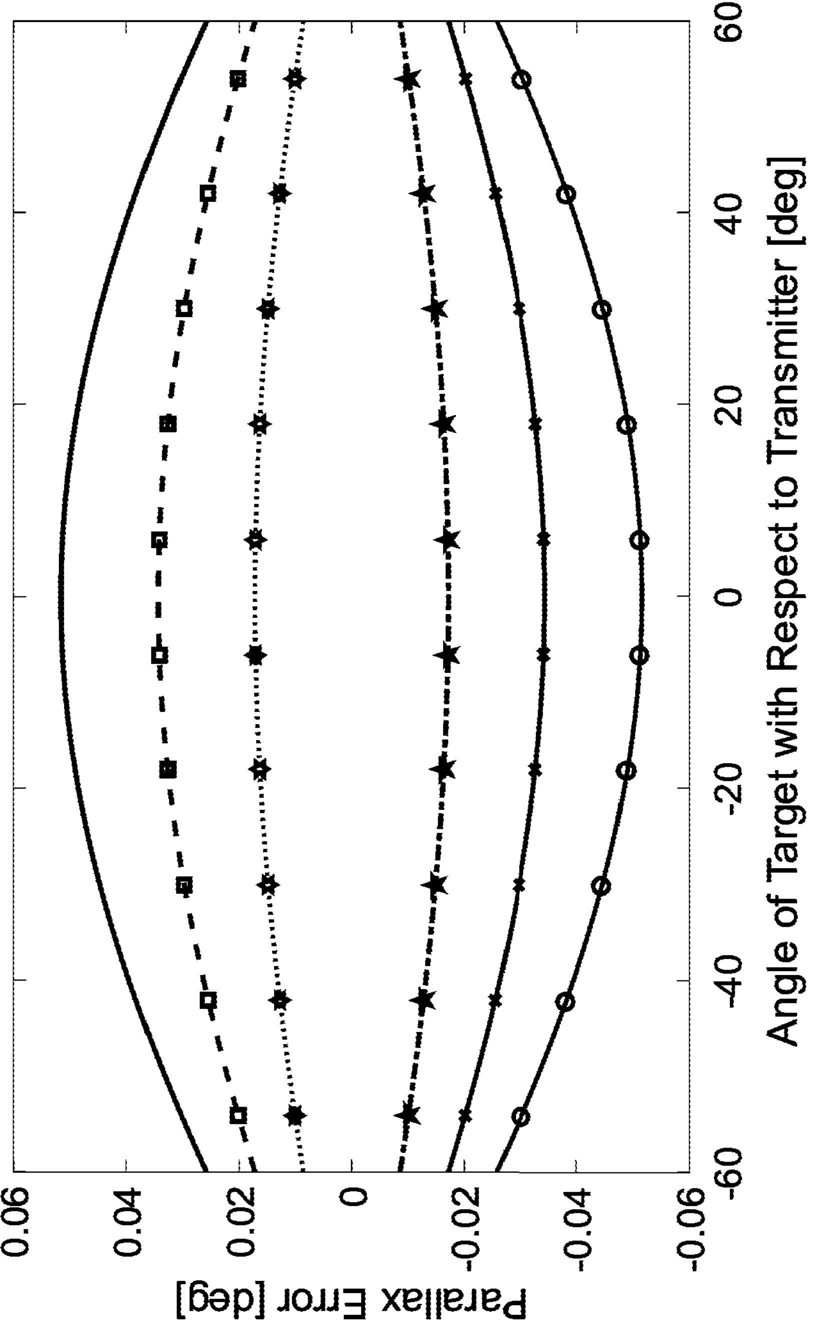

FIG. 8 shows a plot of prophetic example parallax errors, as a function of the angle of a target (assumed to be at 10 m distance) with respect to a transmitter OPA, for various photonic system configurations. Differences between the expected parallax error in the main lobe and the measurement may be used to mark and reject high intensity retroreflectors coupling into the grating lobe.

Figure 9:
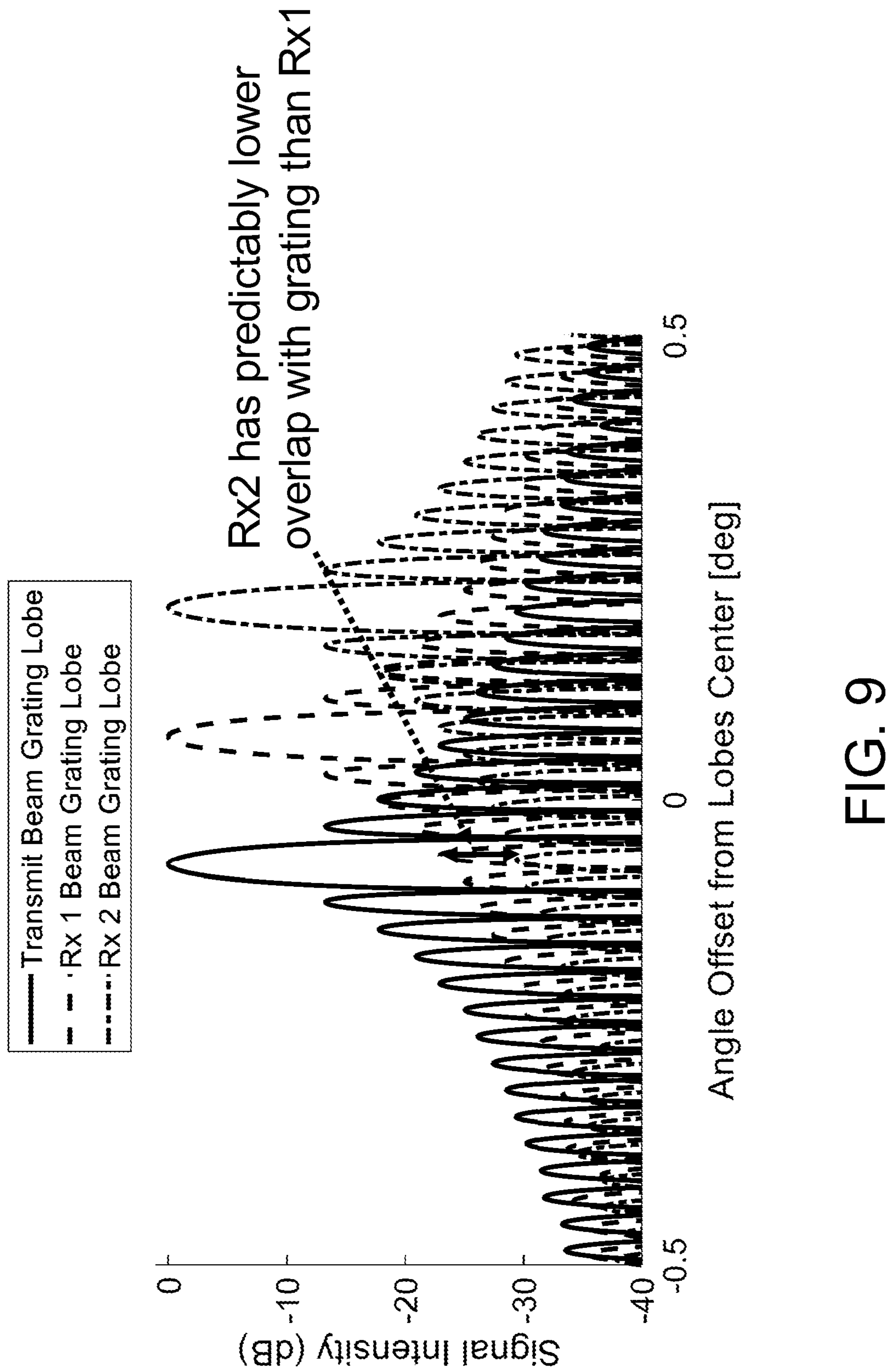
FIG. 9 is a plot of prophetic example radiation intensity patterns for a transmitter OPA and two receiver OPAs, as a function of the angle formed with respect to the center of a lobe.

FIG. 9 shows a plot of prophetic example radiation intensity patterns for a transmitter OPA and two receiver OPAs, as a function of the angle with respect to a reference angle for the lobes. For multistatic LiDAR configurations (e.g., as shown in FIG. 9), each RX aperture may use a different pitch than the TX aperture and also other RX apertures. In this case, different grating lobe coupling is expected for each receiver aperture. Returns with intensity falling off according to the expected mismatch in grating lobe coupling may be marked as a retro-reflector and ignored. In this example, the Rx2 receiver beam grating lobe has a predictably lower overlap with the transmit beam grating lobe than the Rx1 receiver beam grating lobe.

Figure 10:
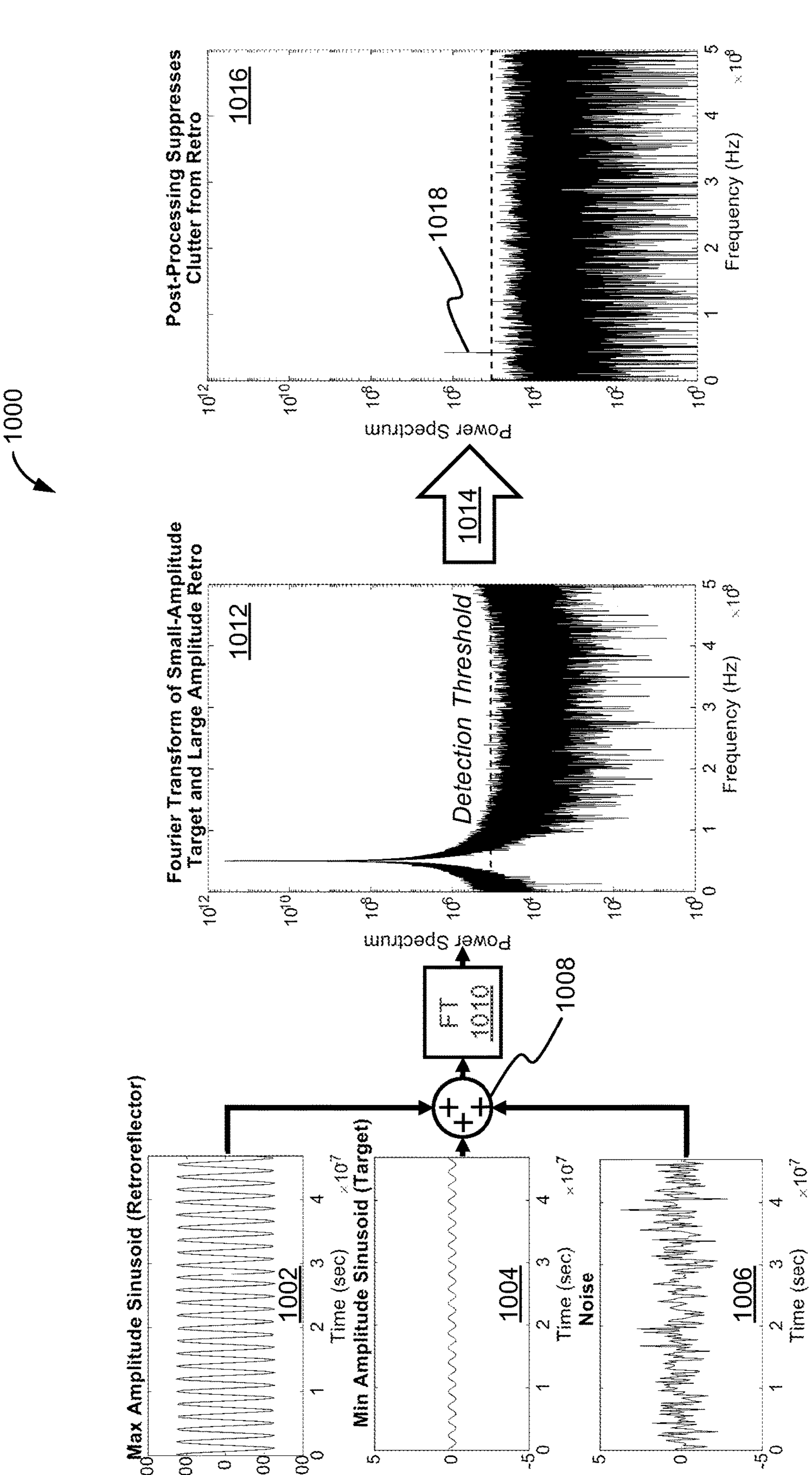
FIG. 10 is a flow diagram of an example spurious image detection and mitigation scheme.

Another spurious signal that may affect LiDAR systems such as FMCW (frequency-modulated continuous wave) LiDAR is frequency domain spreading of a strong reflector into nearby frequency bins, as shown in FIG. 10. The data produced by a single FMCW LiDAR acquisition at single polar and azimuthal angle consists of a finite time complex signal. The frequency content of this signal directly reflects the intensity of light received from various distances from the system, with the frequency bin roughly proportional to the reflector distance. A strong reflector produces a strong sinusoid in the frequency content, which after a finite-time Fourier transform produces a peak with a wide frequency spread, potentially masking weak signals under the frequency-domain shoulders of that peak. One way to remove the peak and its frequency spread may be, for example, inferring the phase and amplitude of the original sinusoid from the Fourier domain information, subtracting that sinusoid from the time domain data, and reevaluating the Fourier transform to reveal previously obscured weak signals. However, other algorithms may work as well.

FIG. 10 shows a flow diagram of an example spurious image detection and mitigation scheme 1000 in an example FMCW LiDAR system. A retroreflector signal 1002, a target signal 1004, and a noise signal 1006 are summed at a summer 1008. A Fourier transform 1010 is performed on the output of the summer 1008. A Fourier transform signal 1012 shows that detection of the target signal 1004 is masked by the retroreflector signal 1002. A mitigation algorithm 1014 attempts to reduce the contribution of the retroreflector signal to the Fourier transform signal 1012. One example mitigation algorithm 1014 finds a peak in the zero-padded Fourier transform signal 1012, synthesizes a sinusoid with a matching complex amplitude, and subtracts the synthesized sinusoid from the original output of the summer 1008. Finally, the Fourier transform 1010 is revaluated, resulting in a retroreflector mitigated signal 1016 comprising a target signal peak 1018 that was previously obscured.

In some aspects, in general, the mitigation techniques described herein include an optical phased array system in which the TX and RX optical phased arrays have mismatched grating lobes. This enables a linear or lensed-linear mode of operation featuring maximum link budget as well as a reduction in the ghosting (i.e., spurious return signals) associated with the multiple grating orders emitted by the TX and RX antenna arrays. It also enables a phase apodized mode featuring even further reduced grating lobe ghosting as well as reduced side lobe ghosting (reduced spurious lateral extent of strong reflectors) in exchange for a small link penalty. These techniques may involve the use of these modes separately or in tandem, where a scene is first scanned using the former mode of operation and then regions of the scene suspected of containing spurious signals are rescanned using the latter mode of operation.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus comprising:

an optical phased array (OPA) comprising:

a plurality of optical antennas separated by a set of spacings, and a plurality of phase shifters configured to impose phase shifts onto light provided to respective optical antennas of the plurality of optical antennas;

a phase shift control module configured to manage the imposed phase shifts, the managing comprising a first mode of operation comprising:

for a first subset of optical antennas within a distance from a center of the plurality of optical antennas, determining variations of imposed phase shifts smaller than a phase shift variation range, and for a second subset of optical antennas further than the distance from the center of the plurality of optical antennas, determining variations of imposed phase shifts larger than the phase shift variation range.

2. The apparatus of claim 1, wherein determining variations of imposed phase shifts for the first subset of optical antennas and determining variations of imposed phase shifts for the second subset of optical antennas comprise determining variations according to a probability distribution.

3. The apparatus of claim 2, wherein determining variations according to a probability distribution comprises determining variations according to a pseudorandom function.

4. The apparatus of claim 1, wherein the managing further comprises a second mode of operation comprising:

for the first subset of optical antennas and the second subset of optical antennas, determining imposed phase shifts corresponding to a deterministic phase profile.

5. The apparatus of claim 4, wherein the deterministic phase profile comprises a linear phase profile that defines a common phase shift to be imposed upon each of the plurality of phase shifters.

6. The apparatus of claim 4, wherein the managing further comprises a first scanning mode of operation, wherein a first region is scanned by managing the imposed phase shifts in the first mode of operation for two or more transmitted beam angles.

7. The apparatus of claim 6, wherein the managing further comprises a second scanning mode of operation, wherein a second region is scanned by managing the imposed phase shifts in the second mode of operation for two or more transmitted beam angles.

8. The apparatus of claim 7, where the first region is a subset of the second region.

9. The apparatus of claim 1, further comprising a control module configured to receive scattered light that was emitted from the OPA and estimate a distance to a target based at least in part on a characteristic of the scattered light.

10. The apparatus of claim 9, wherein the OPA is a first OPA and the apparatus further comprises second OPA configured to receive the scattered light that was emitted from the first OPA and provide the scattered light to the control module.

11. The apparatus of claim 1, wherein the spacings in the set of spacings are each greater than half of any wavelength in a spectrum of light provided to the plurality of optical antennas in the OPA.

12. The apparatus of claim 1, wherein the spacings in the set of spacings are all identical to each other.

13. A method comprising:

providing light to a plurality of optical antennas separated by a set of spacings in an optical phased array (OPA), wherein a plurality of phase shifters impose phase shifts onto light provided to respective optical antennas of the plurality of optical antennas; and managing the imposed phase shifts using a phase shift control module, the managing comprising a first mode of operation comprising:

for a first subset of optical antennas within a distance from a center of the plurality of optical antennas, determining variations of imposed phase shifts smaller than a phase shift variation range, and for a second subset of optical antennas further than the distance from the center of the plurality of optical antennas, determining variations of imposed phase shifts larger than the phase shift variation range.

14. The method of claim 13, wherein determining variations of imposed phase shifts for the first subset of optical antennas and determining variations of imposed phase shifts for the second subset of optical antennas comprise determining variations according to a probability distribution.

15. The method of claim 14, wherein determining variations according to a probability distribution comprises determining variations according to a pseudorandom function.

16. The method of claim 13, wherein the managing further comprises a second mode of operation comprising:

for the first subset of optical antennas and the second subset of optical antennas, determining imposed phase shifts corresponding to a deterministic phase profile.

17. The method of claim 16, wherein the deterministic phase profile comprises a linear phase profile that defines a common phase shift to be imposed upon each of the plurality of phase shifters.

18. The method of claim 16, wherein the managing further comprises a first scanning mode of operation, wherein a first region is scanned by managing the imposed phase shifts in the first mode of operation for two or more transmitted beam angles.

19. The method of claim 18, wherein the managing further comprises a second scanning mode of operation, wherein a second region is scanned by managing the imposed phase shifts in the second mode of operation for two or more transmitted beam angles.

20. The method of claim 19, where the first region is a subset of the second region.

21. The method of claim 13, further comprising receiving scattered light that was emitted from the OPA and estimating a distance to a target based at least in part on a characteristic of the scattered light.

22. The method of claim 21, wherein the OPA is a first OPA and the method further comprises receiving the scattered light that was emitted from the first OPA into a second OPA and providing the scattered light for estimating the distance.

* * * * *